US011958264B2

(12) United States Patent
Hutchison et al.

(10) Patent No.: US 11,958,264 B2
(45) **Date of Patent: *Apr. 16, 2024**

(54) GRAPHIC ARTS ASSEMBLY WITH MAGNETIC SUPPORT STRUCTURE

(71) Applicant: Universal Engraving, Inc., Overland Park, KS (US)

(72) Inventors: Larry R. Hutchison, Overland Park, KS (US); Eric A. Domsch, Olathe, KS (US)

(73) Assignee: Universal Engraving, Inc., Overland Park, KS (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/566,824

(22) Filed: Dec. 31, 2021

(65) Prior Publication Data

US 2022/0118728 A1 Apr. 21, 2022

Related U.S. Application Data

(63) Continuation of application No. 15/952,344, filed on Apr. 13, 2018, now Pat. No. 11,225,042.

(60) Provisional application No. 62/485,680, filed on Apr. 14, 2017.

(51) Int. Cl.

| | |
|---|---|
| ***B41F 27/04*** | (2006.01) |
| ***B30B 15/02*** | (2006.01) |
| ***B41F 16/00*** | (2006.01) |
| ***B41F 27/08*** | (2006.01) |
| ***B44B 5/00*** | (2006.01) |
| ***B44B 5/02*** | (2006.01) |

(Continued)

(52) U.S. Cl.
CPC .......... *B30B 15/026* (2013.01); *B41F 16/004* (2013.01); *B41F 16/006* (2013.01); *B44B 5/0019* (2013.01); *B44B 5/0057* (2013.01); *B44B 5/022* (2013.01); *B44B 5/026* (2013.01); *B44C 1/24* (2013.01); *B41F 27/005* (2013.01); *B41F 27/04* (2013.01); *B41F 27/08* (2013.01); *B41P 2219/20* (2013.01)

(58) Field of Classification Search
CPC ........ B41F 27/005; B41F 27/14; B41F 27/04; B41F 27/08; B41F 27/02
See application file for complete search history.

(56) References Cited

U.S. PATENT DOCUMENTS

| | | | | |
|---|---|---|---|---|
| 5,792,262 A * | 8/1998 | Bohn | B41F 27/02 118/244 |
| 2012/0186471 A1* | 7/2012 | Hutchison | B41F 27/02 101/390 |

* cited by examiner

*Primary Examiner* — Jill E Culler
*Assistant Examiner* — Ruben C Parco, Jr.
(74) *Attorney, Agent, or Firm* — Hovey Williams LLP

(57) ABSTRACT

A graphic arts support assembly is operable to be used with a graphic arts plate assembly in a press. The graphic arts support assembly and the plate assembly are configured for removable association with a lift mechanism including a shiftable lift element. The support assembly includes a graphic arts magnetic support structure operable to removably support the graphic arts plate assembly. The magnetic support structure includes a support plate, a magnet fixed relative to the plate, and an alignment element projecting from the support plate. The support assembly is operable to be mounted on the lift mechanism so that the lift element is aligned with a lift opening of the support plate, with the lift element shiftable through the lift opening to locate at least part of the graphic arts plate assembly away from the support plate.

20 Claims, 32 Drawing Sheets

(51) Int. Cl.

| | |
|---|---|
| ***B44C 1/24*** | (2006.01) |
| *B41F 27/00* | (2006.01) |

GRAPHIC ARTS ASSEMBLY WITH MAGNETIC SUPPORT STRUCTURE

CROSS-REFERENCE TO RELATED APPLICATIONS

This is a continuation of prior application Ser. No. 15/952,344, filed Apr. 13, 2018, entitled GRAPHIC ARTS ASSEMBLY WITH MAGNETIC SUPPORT STRUCTURE, which application claims the benefit of U.S. Provisional Application Ser. No. 62/485,680, filed Apr. 14, 2017, entitled MAGNETIC CHASE AND GRAPHIC ARTS DIE PLATE ASSEMBLY, each of which is hereby incorporated in its entirety by reference herein.

BACKGROUND

1. Field

The present invention relates generally to a graphic arts assembly with a magnetic support structure. More specifically, embodiments of the present invention concern a graphic arts die assembly with a magnetic chase and a die plate assembly that are configured for removable disassociation using a lift mechanism. Other embodiments of the present invention concern a graphic arts counter assembly with a magnetic platen and a counter plate assembly that are configured for removable disassociation using a lift mechanism.

2. Discussion of Prior Art

A graphic arts press commonly uses a graphic arts die assembly and a graphic arts counter assembly for embossing, debossing, and/or foil stamping of a substrate. Conventional press systems include a die assembly with a series of dies that are secured in registration with a series of counters provided by the counter assembly. In some prior art systems, dies are individually positioned on the chase such that the die mounting process involves an extensive setup time.

Other known systems have been developed to secure multiple dies in registration on a common plate. Such a die assembly can be subsequently mounted on a chase so that the dies (supported on the common plate) are mounted on the chase at the same time. This process requires less time than individual die mounting. However, conventional chase and die assemblies are unsuitably heavy. Furthermore, some prior art chases for use with dies on a common plate are overly complicated.

SUMMARY

The following brief summary is provided to indicate the nature of the subject matter disclosed herein. While certain aspects of the present invention are described below, the summary is not intended to limit the scope of the present invention.

Embodiments of the present invention provide a graphic arts assembly that does not suffer from the problems and limitations of the prior art graphic arts systems set forth above.

A first aspect of the present invention concerns a graphic arts support assembly operable to be used with a graphic arts plate assembly in a press. The graphic arts support and plate assemblies are configured for removable association with a lift mechanism including a shiftable lift element. The graphic arts support assembly broadly includes a graphic arts magnetic support structure operable to removably support the graphic arts plate assembly. The magnetic support structure includes a support plate, a magnet fixed relative to the plate, and an alignment element. The magnet is operable to removably secure the graphic arts plate assembly in engagement with the support plate. The alignment element is configured to engage and thereby position the graphic arts plate assembly relative to the support plate. The support plate presents a lift opening positioned to removably receive the lift element. The graphic arts support assembly is operable to be mounted on the lift mechanism so that the lift element is aligned with the lift opening, with the lift element shiftable through the lift opening to locate at least part of the graphic arts plate assembly away from the support plate.

A second aspect of the present invention concerns a graphic arts assembly operable to be used with a graphic arts plate assembly. The graphic arts assembly broadly includes a lift mechanism and a graphic arts support assembly. The lift mechanism includes a shiftable lift element. The support assembly is operable to support the graphic arts plate assembly on the lift mechanism and in a press. The support assembly includes a graphic arts magnetic support structure operable to removably support the plate assembly. The magnetic support structure includes a support plate, a magnet fixed relative to the plate, and an alignment element. The magnet is operable to removably secure the graphic arts plate assembly in engagement with the support plate. The alignment element is configured to engage and thereby position the graphic arts plate assembly relative to the support plate. The support plate presents a lift opening positioned to removably receive the lift element. The graphic arts support assembly is removably mounted on the lift mechanism so that the lift element is aligned with the lift opening. The lift element is shiftable into and out of an extended position where the lift element extends entirely through the lift opening to locate at least part of the graphic arts plate assembly away from the support plate.

A third aspect of the present invention concerns a graphic arts system broadly including a lift mechanism, a graphic arts plate assembly, and a graphic arts support assembly. The lift mechanism includes a shiftable lift element. The support assembly supports the graphic arts plate assembly on the lift mechanism and in a press. The support assembly includes a graphic arts support structure removably supporting the graphic arts plate assembly. The support structure includes a support plate and an alignment element. The alignment element is configured to engage and thereby position the graphic arts plate assembly relative to the support plate. The support plate presents a lift opening positioned to removably receive the lift element. The plate assembly is removably and magnetically secured to the support plate. The support assembly is removably mounted on the lift mechanism so that the lift element is aligned with the lift opening. The lift element is shiftable into and out of an extended position where the lift element extends entirely through the lift opening to locate at least part of the graphic arts plate assembly away from the support plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
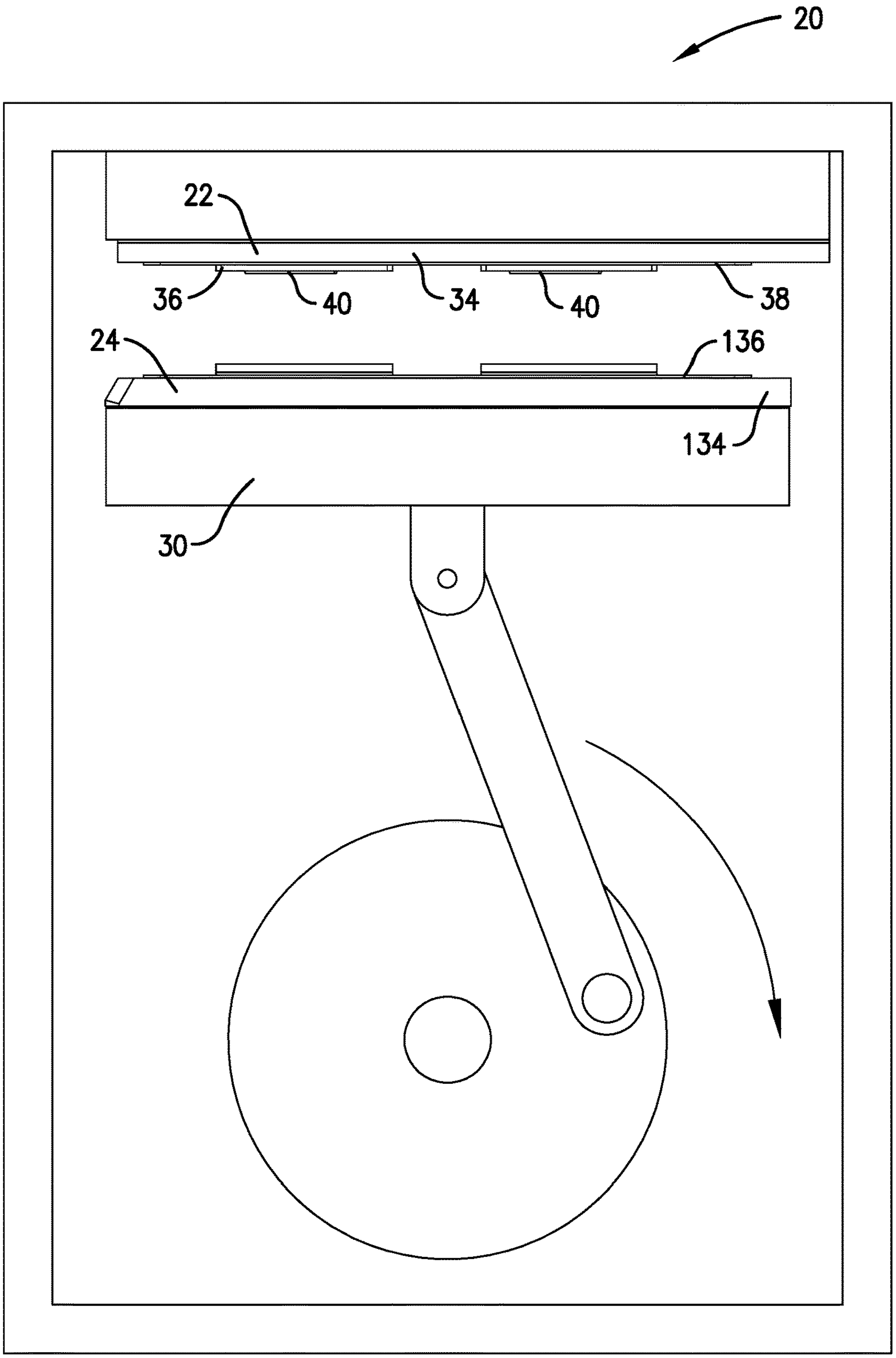
FIG. 1 is a a schematic view of a press constructed in accordance with a first preferred embodiment of the present invention and including a graphic arts die assembly and a graphic arts counter assembly.
Figure 7:
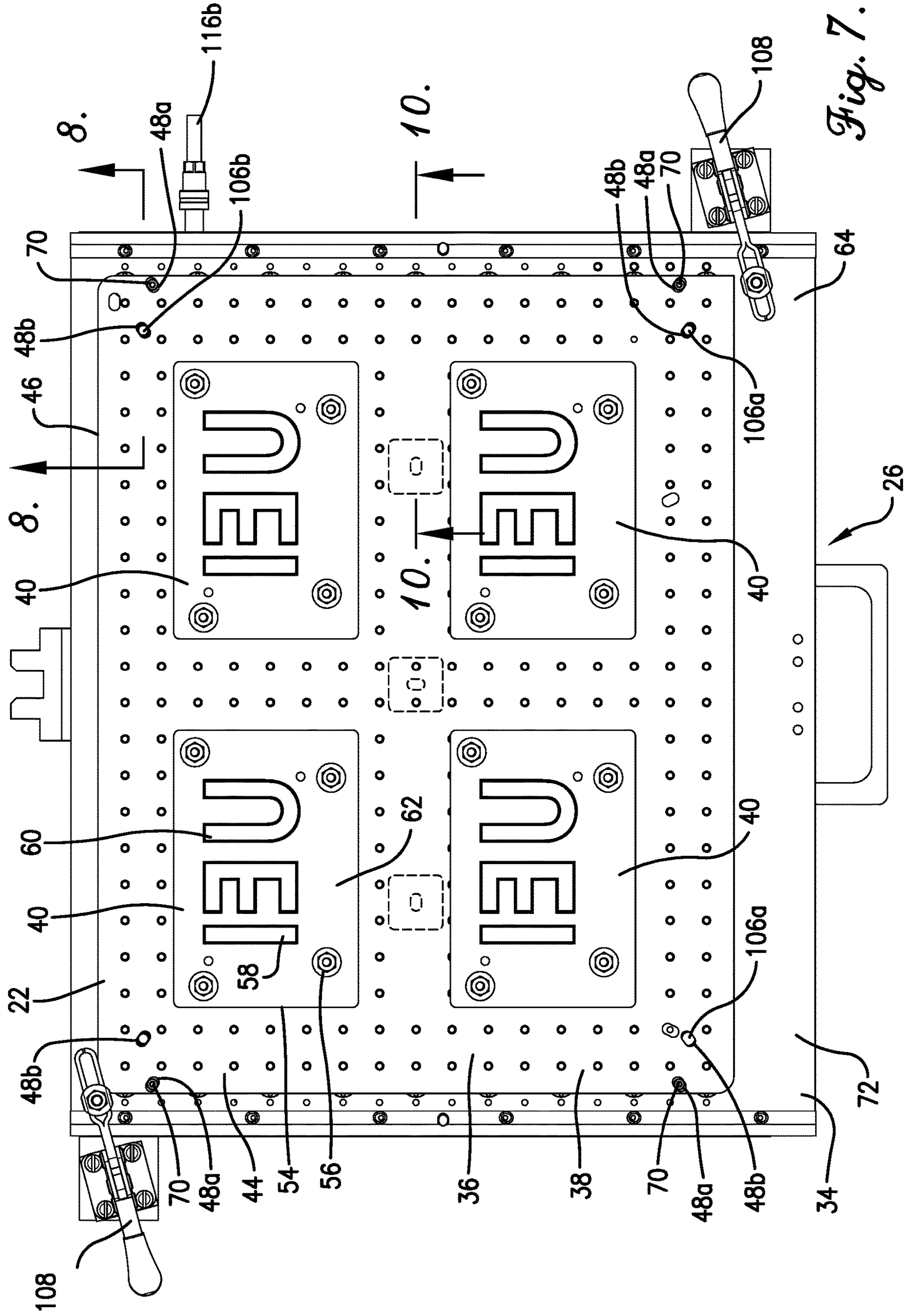
FIG. 7 is a top view of the graphic arts die assembly and lift mechanism shown in FIG. 4, showing the die plate assembly aligned with and mounted on the chase assembly.
Figure 7A:
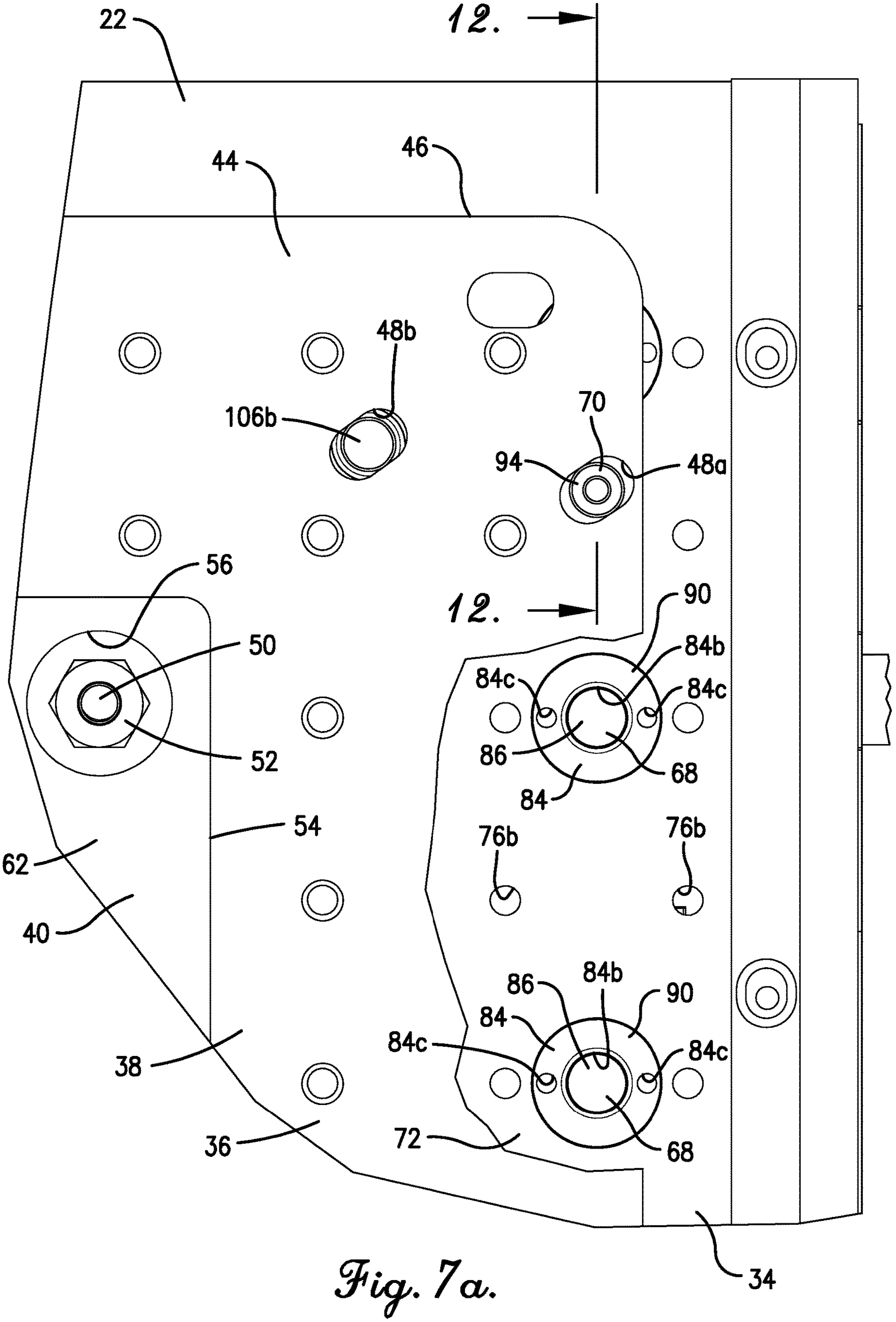
Figure 8:
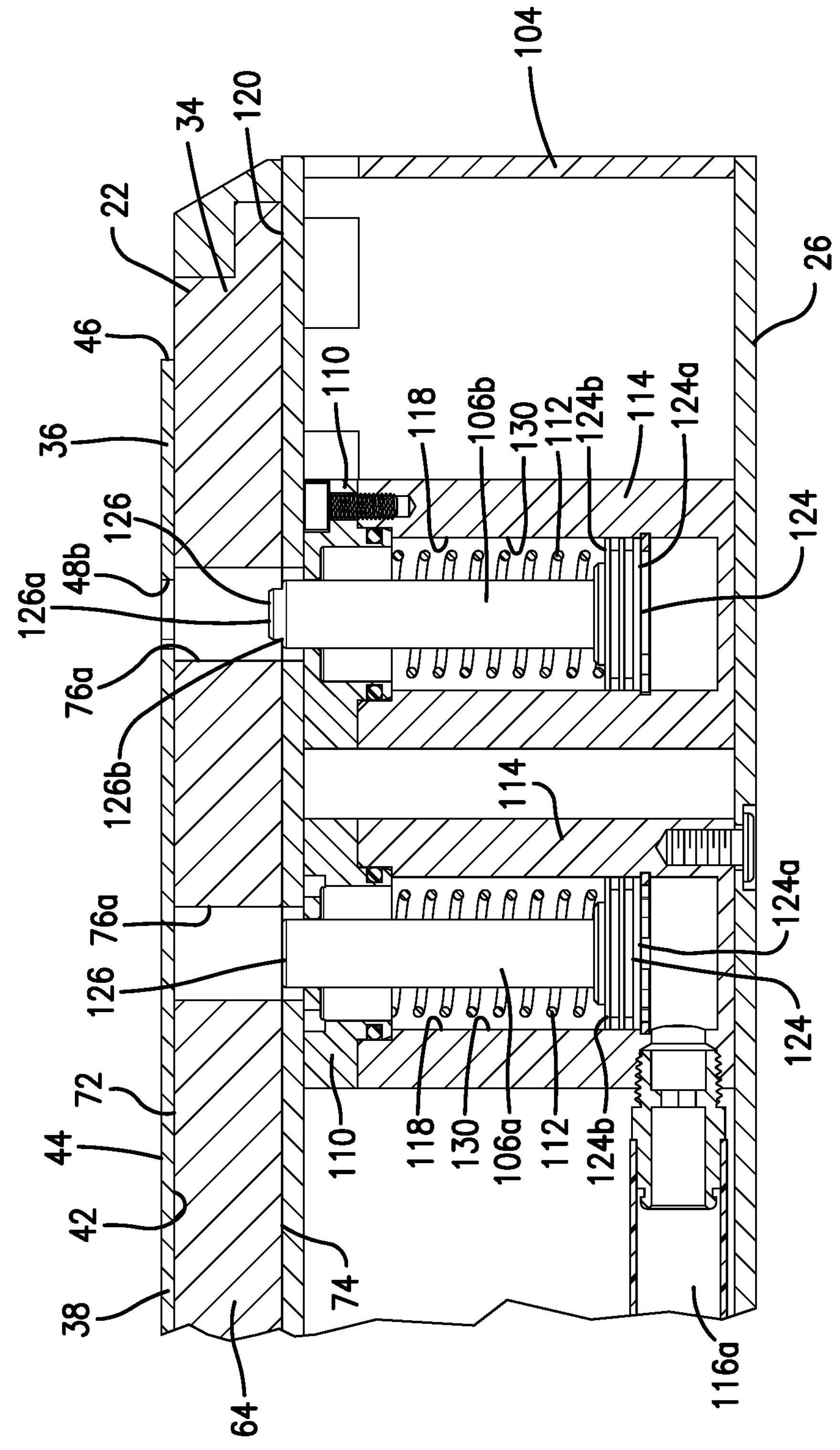
Figure 9:
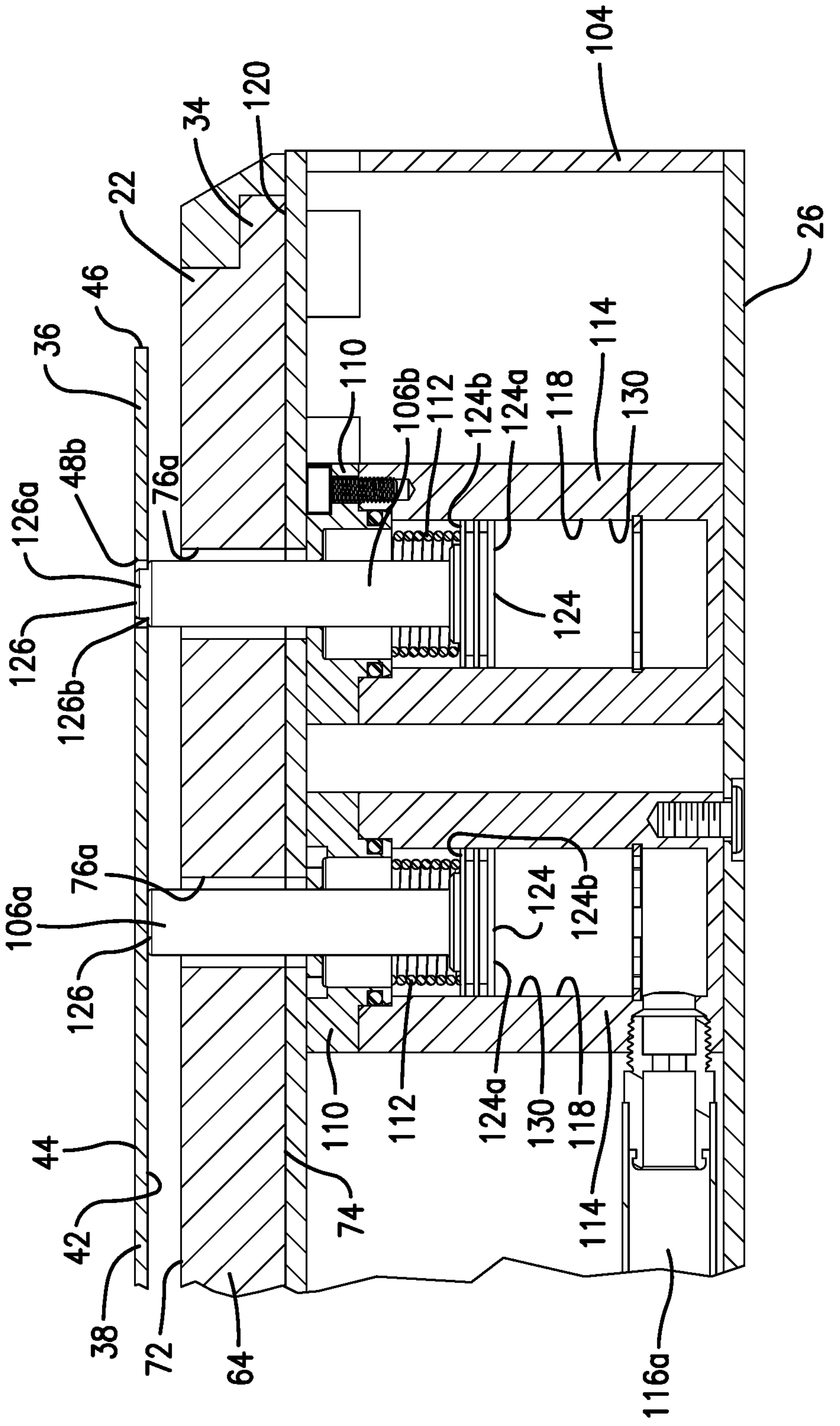
Figure 10:
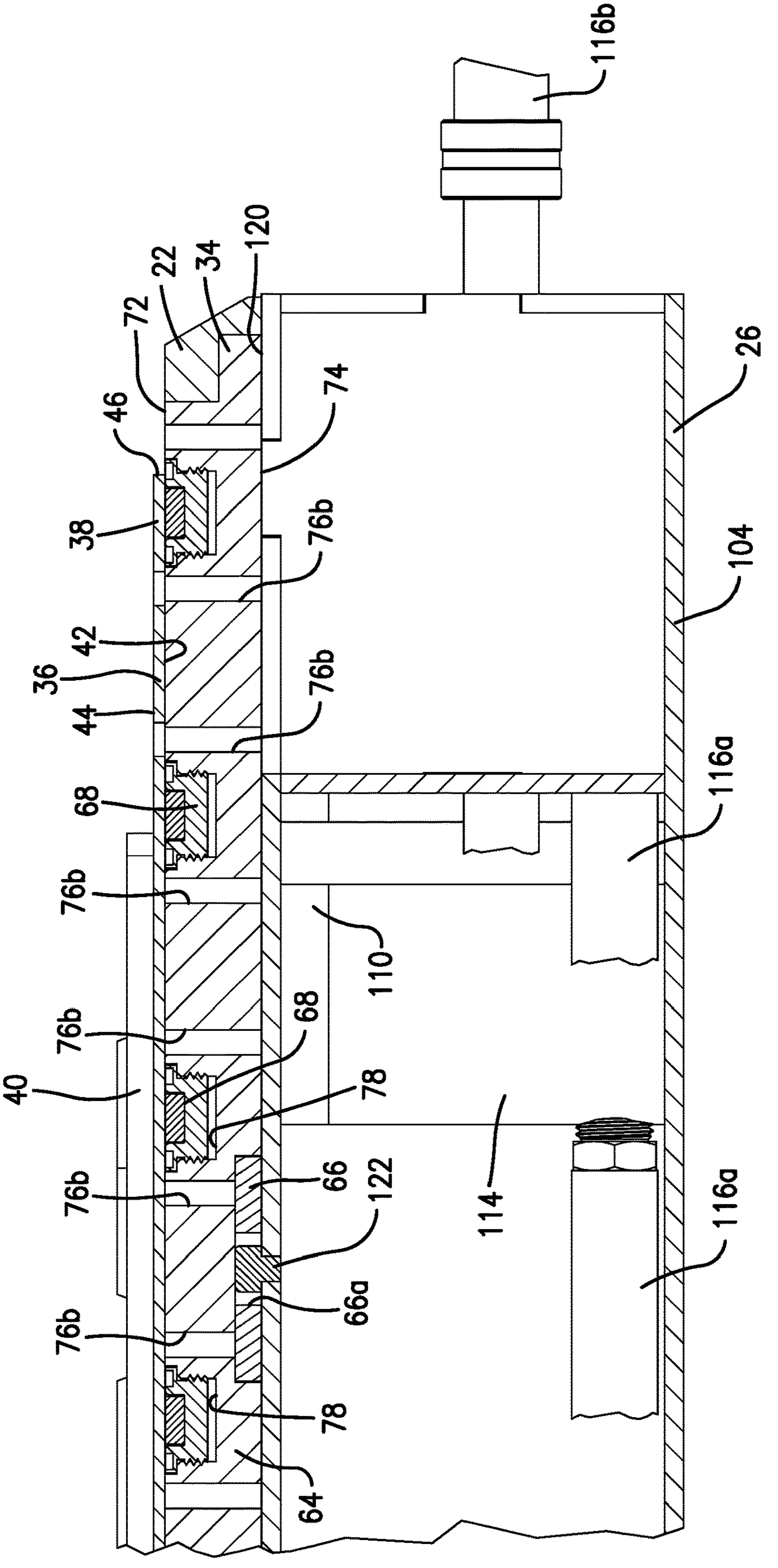
Figure 11:
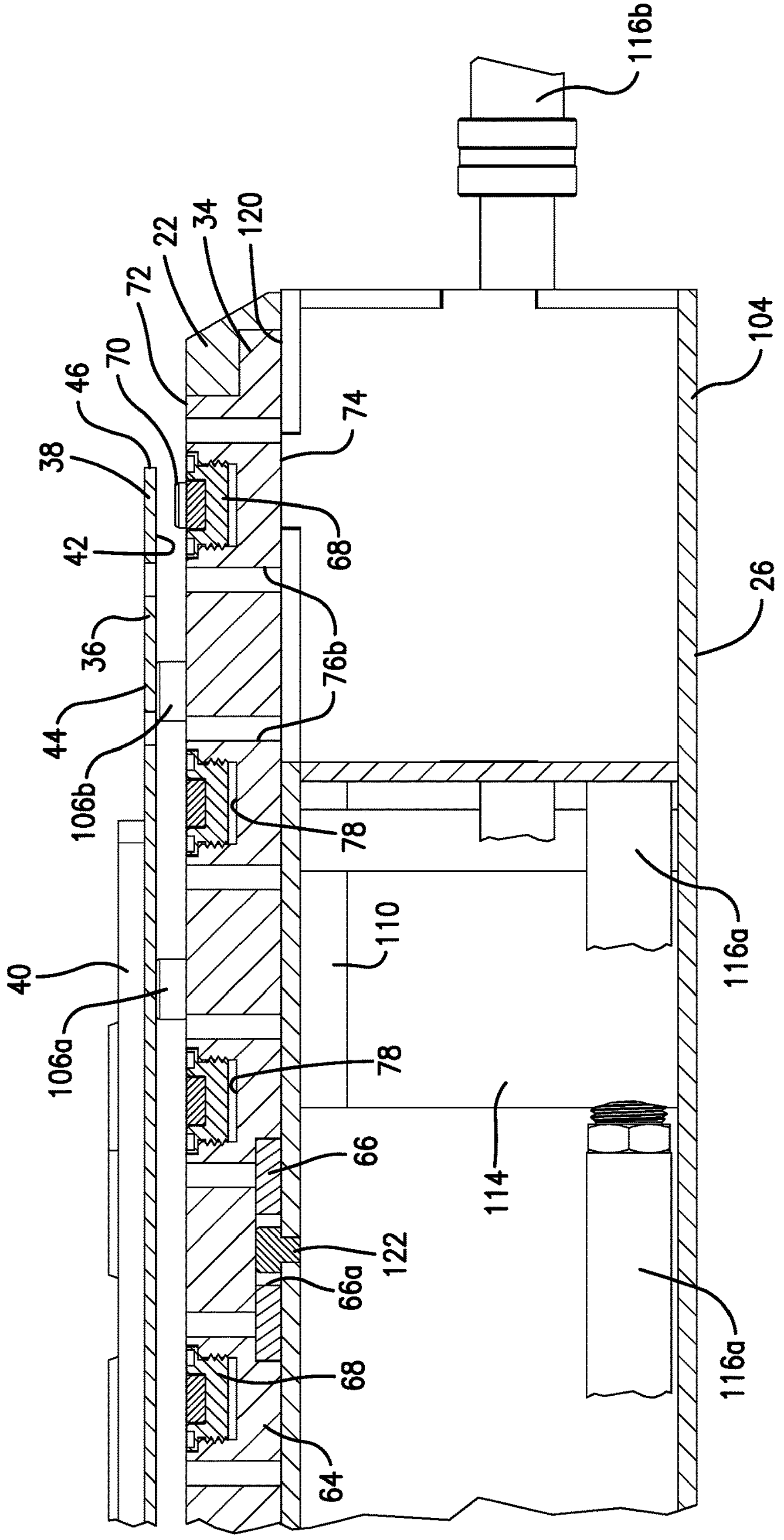
Figure 12:
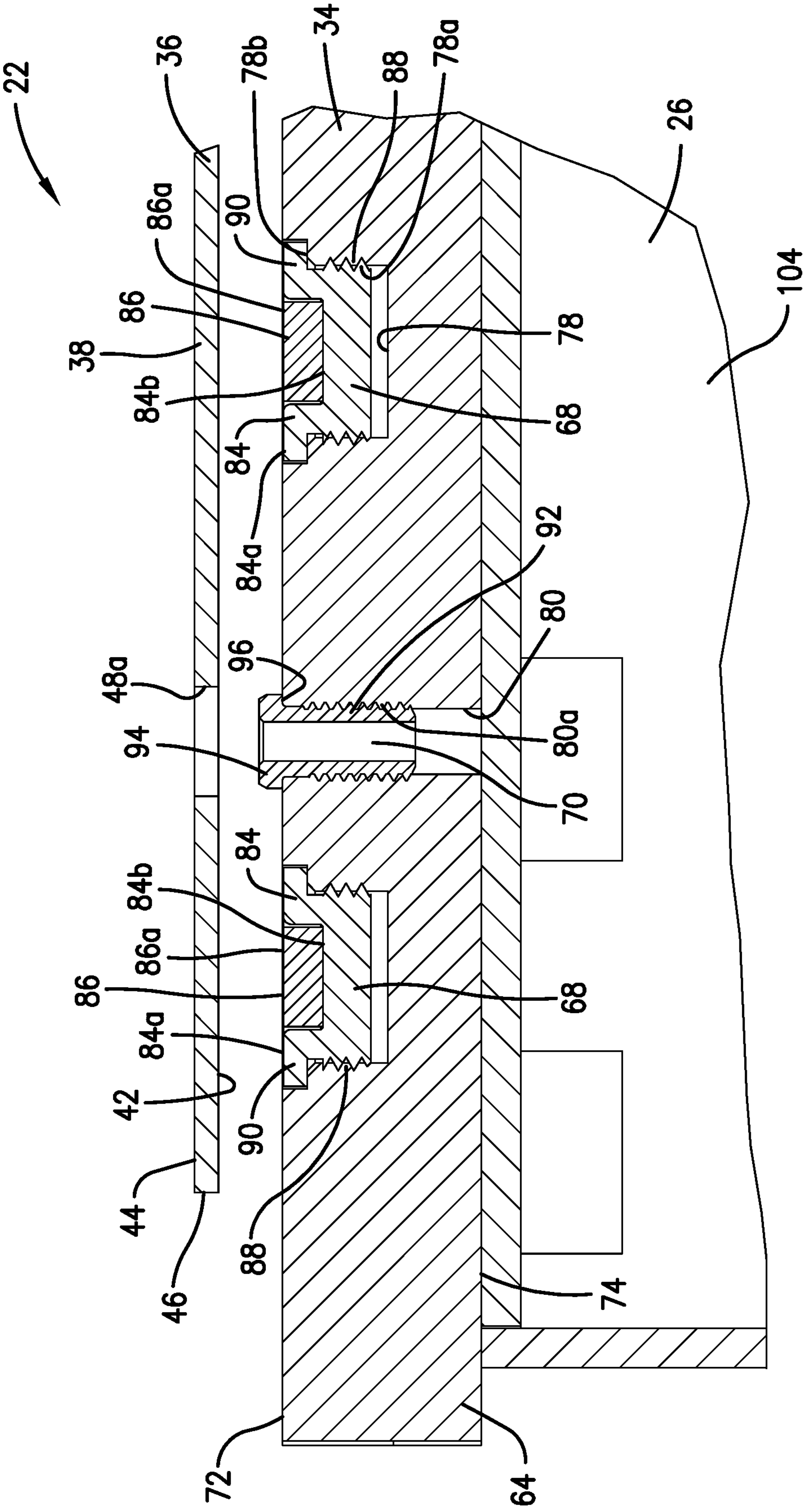
Figure 13:
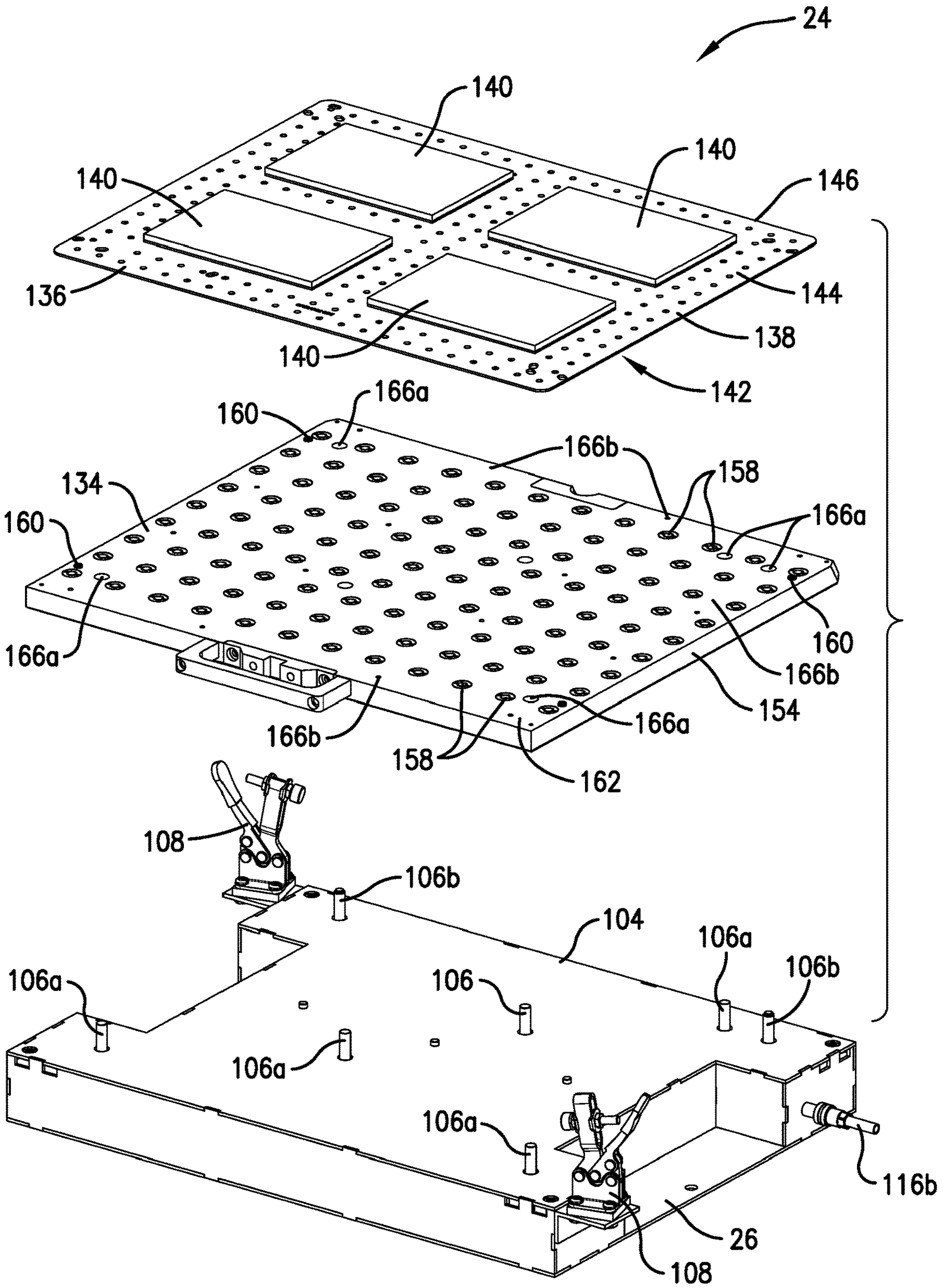
Figure 14:
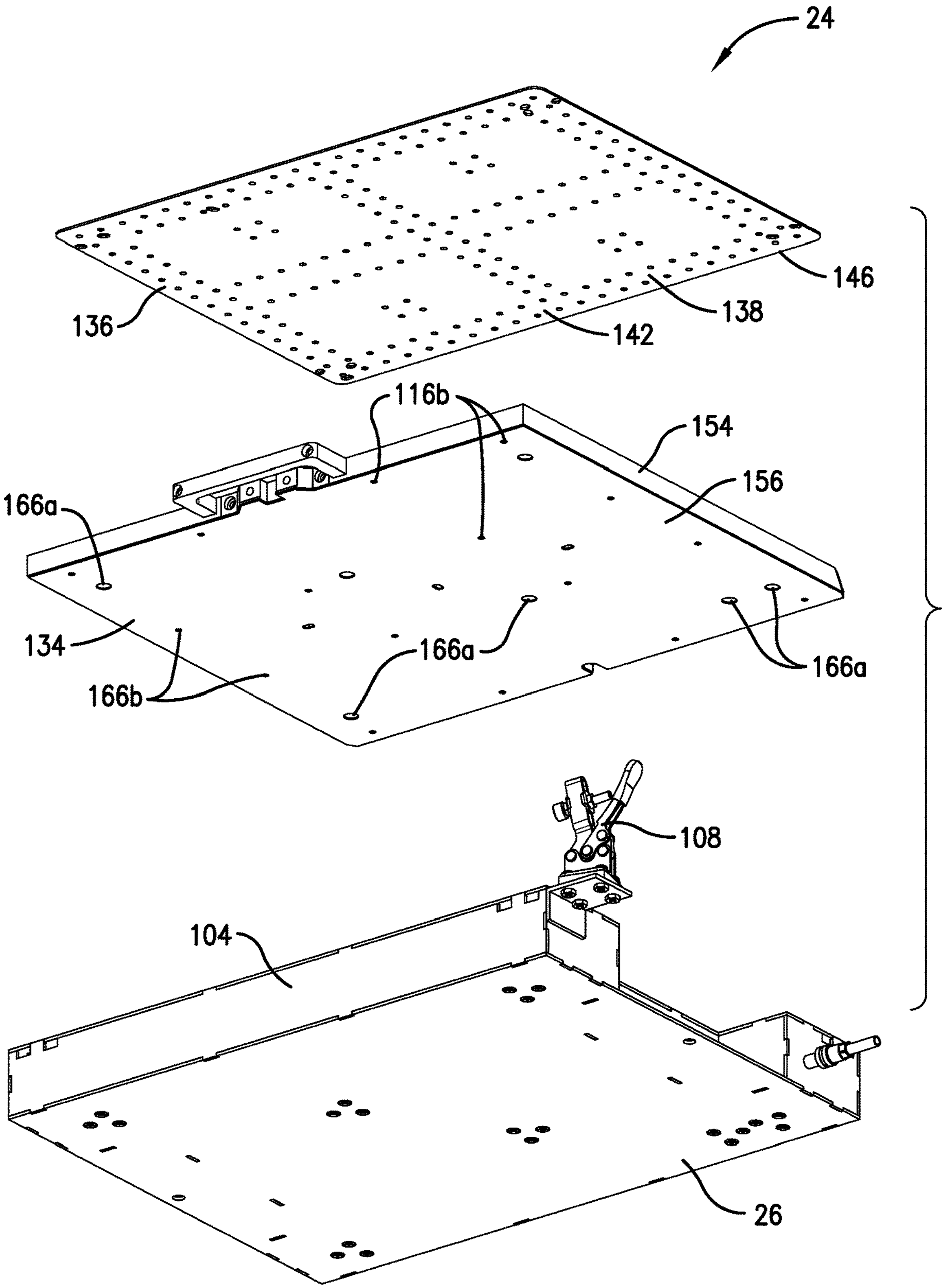
Figure 15:
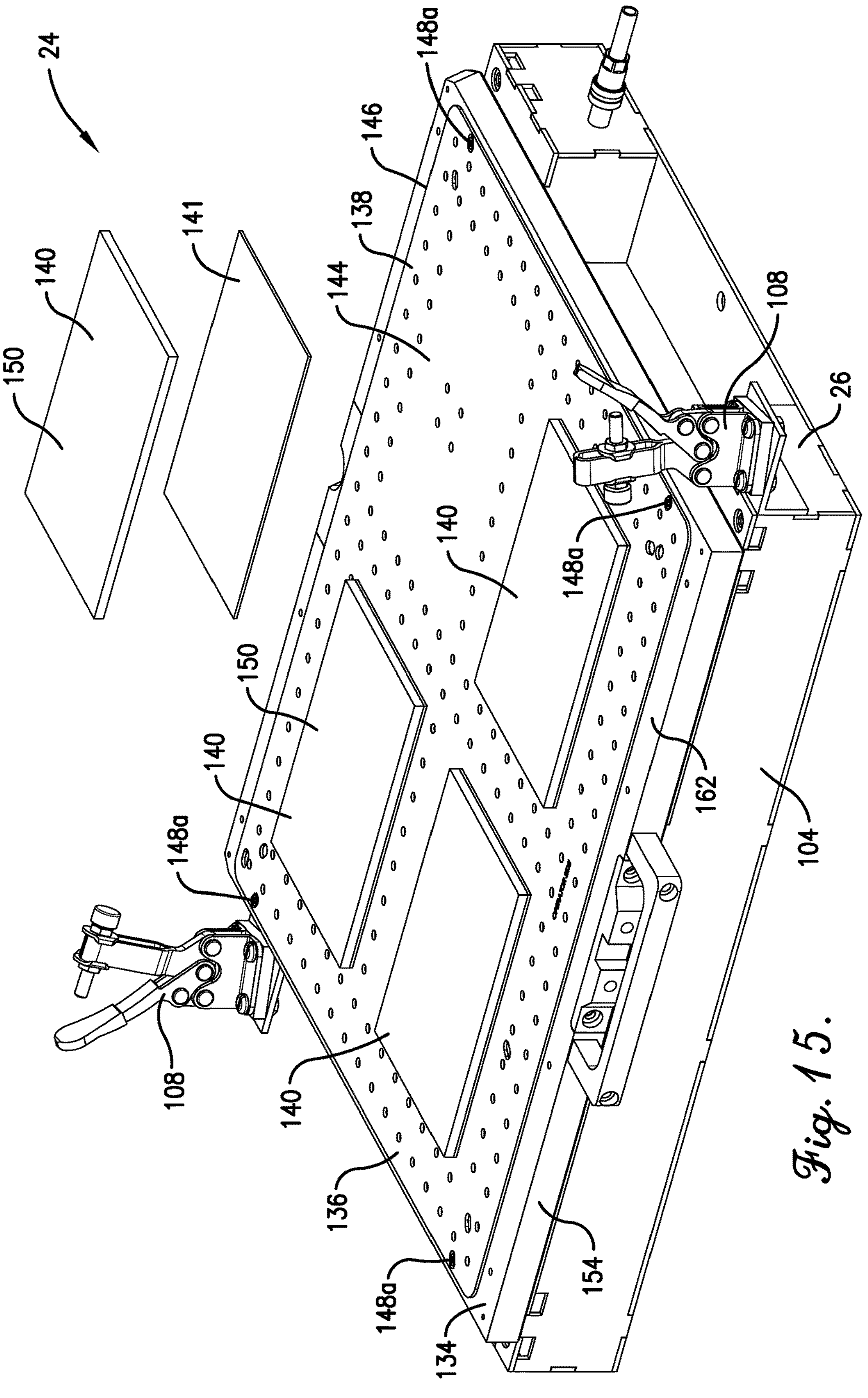
Figure 16:
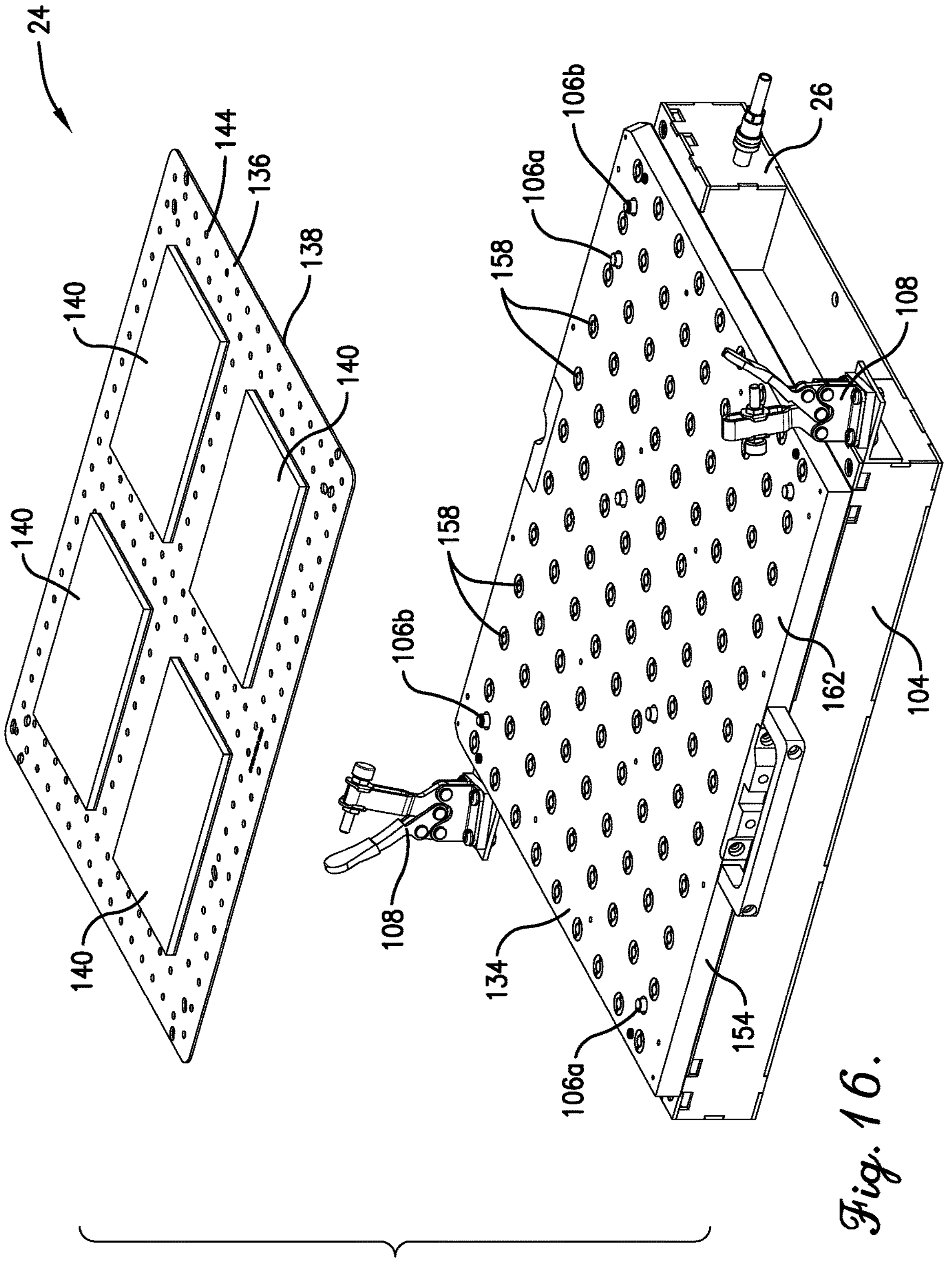
Figure 17:
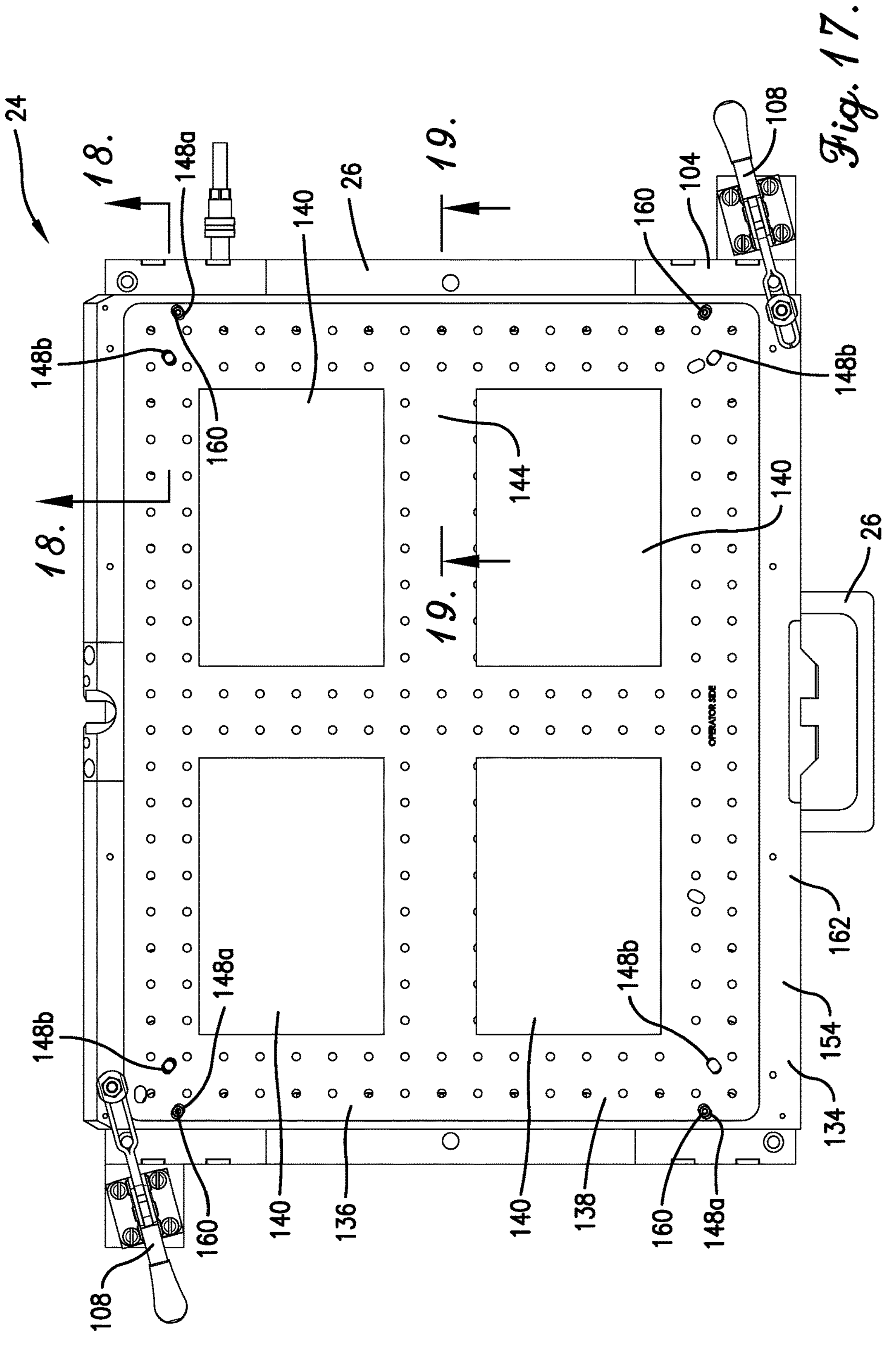
Figure 17A:
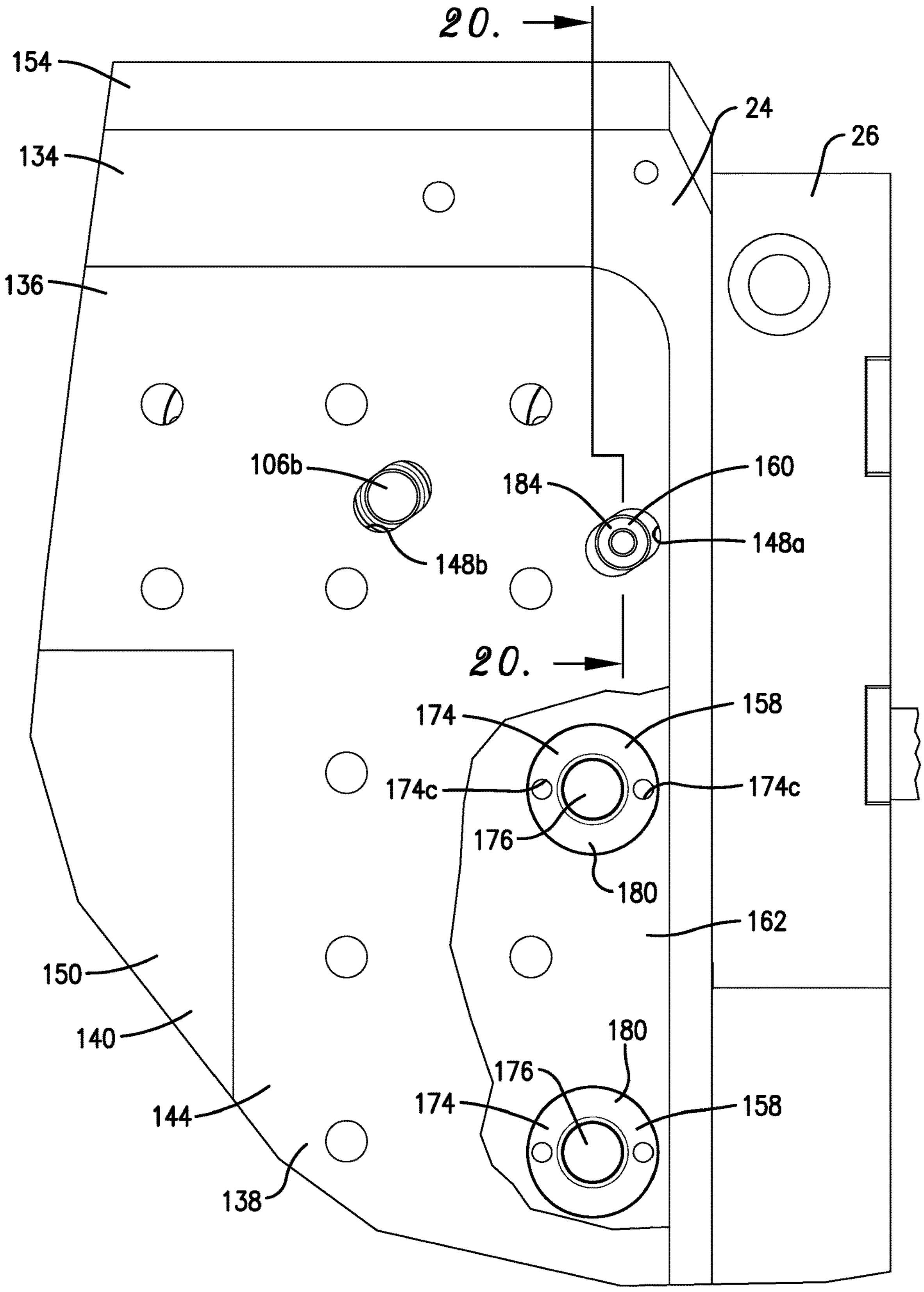
Figure 18:
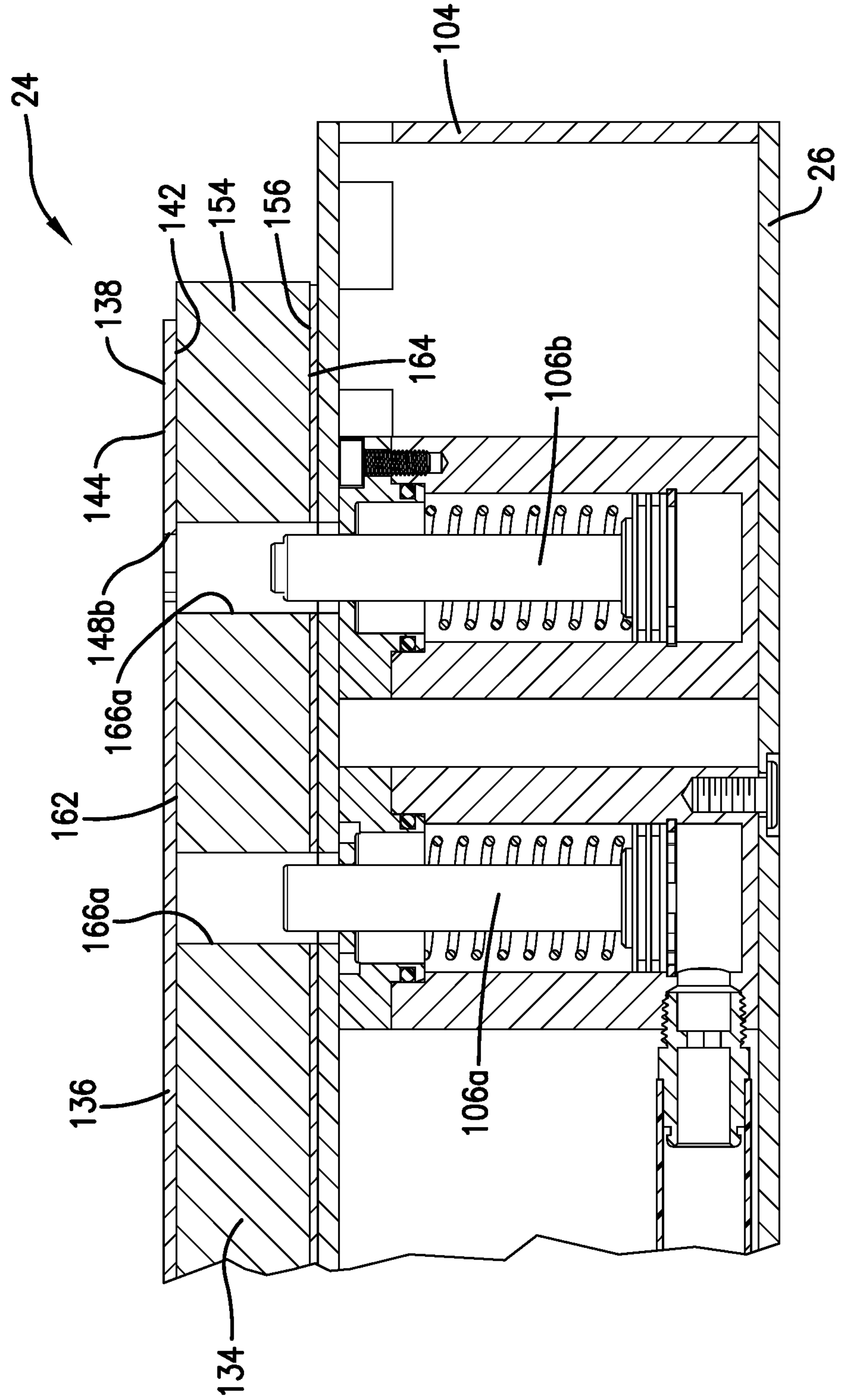
Figure 19:
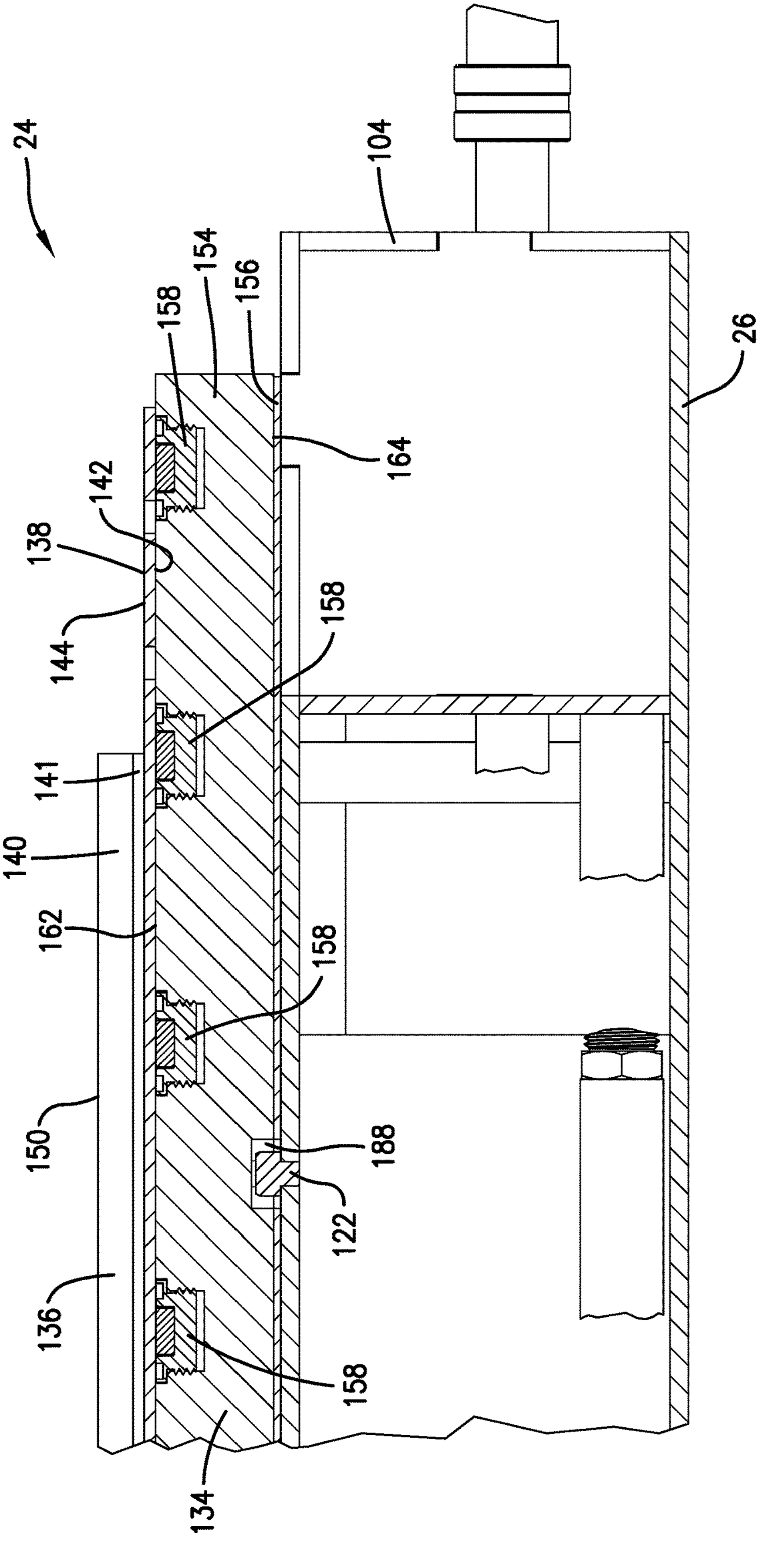
Figure 20:
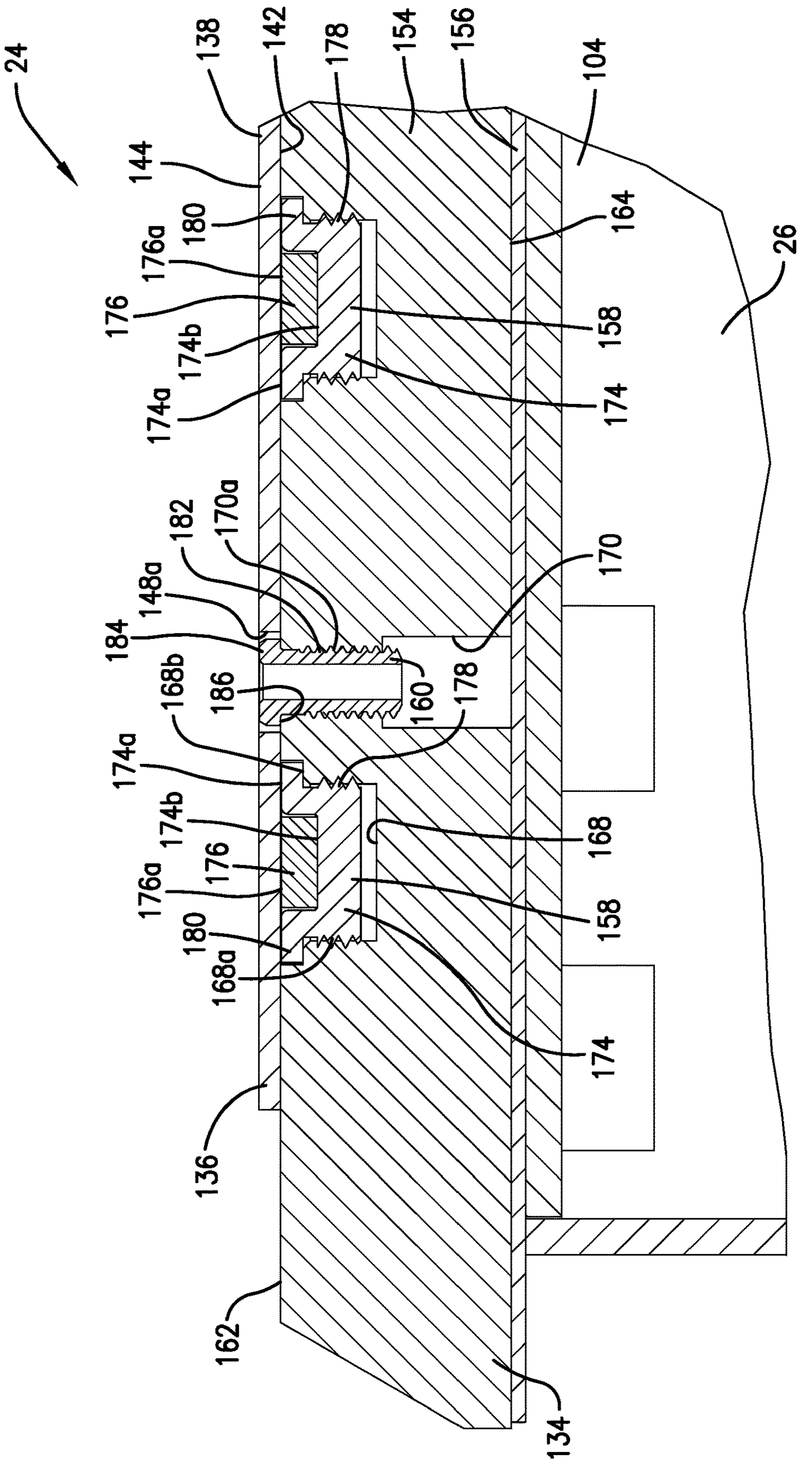
Figure 21:
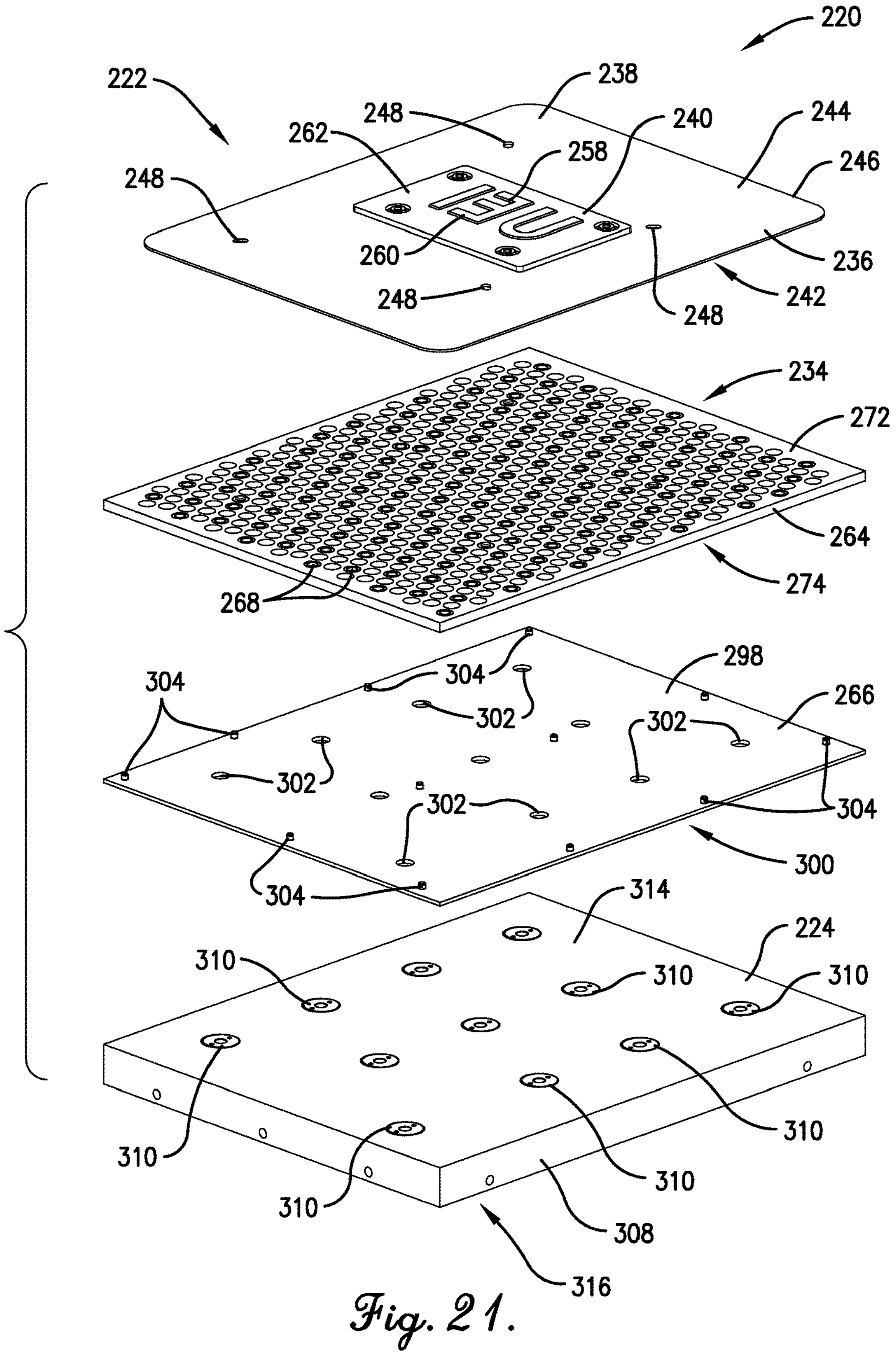
Figure 22:
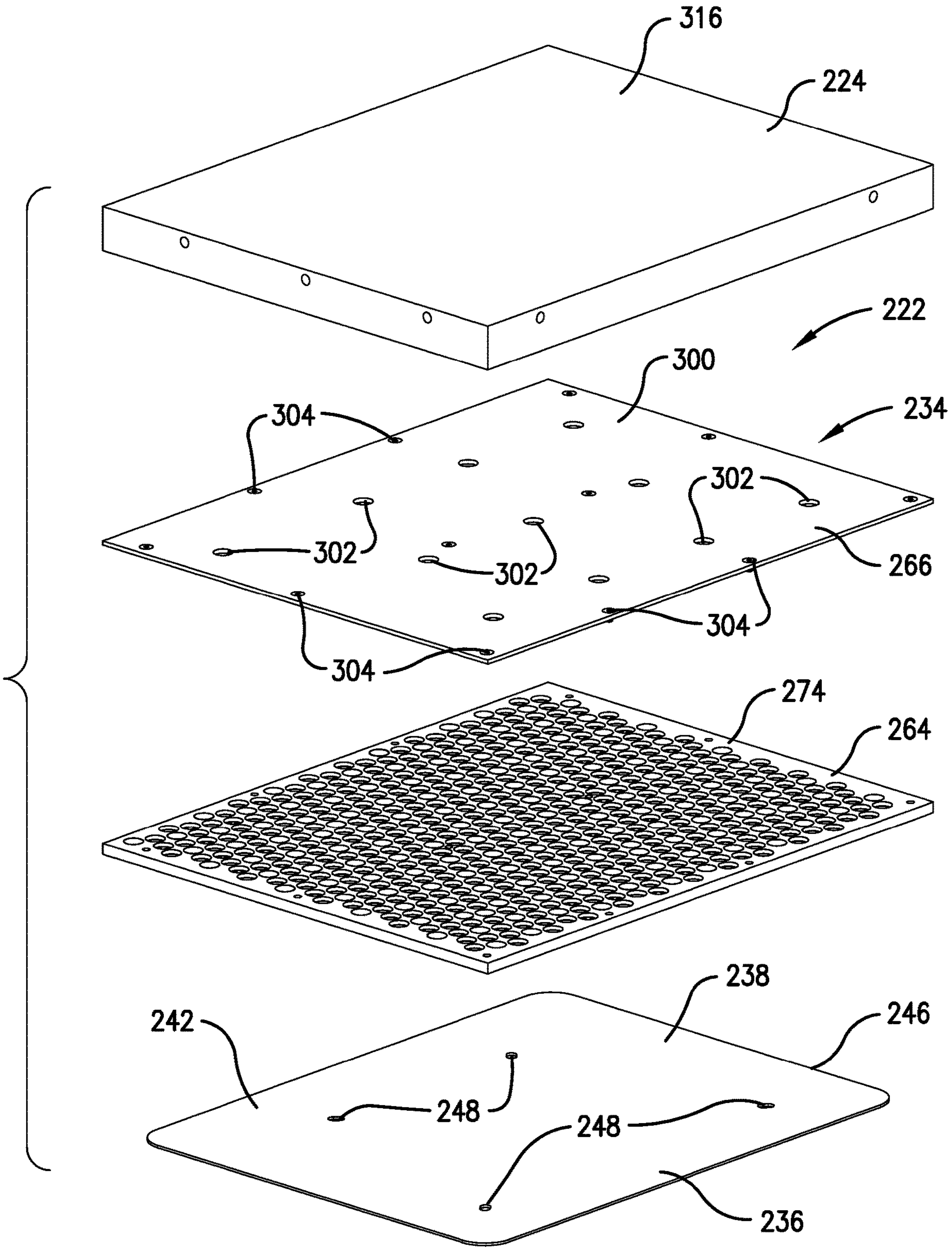
Figure 23:
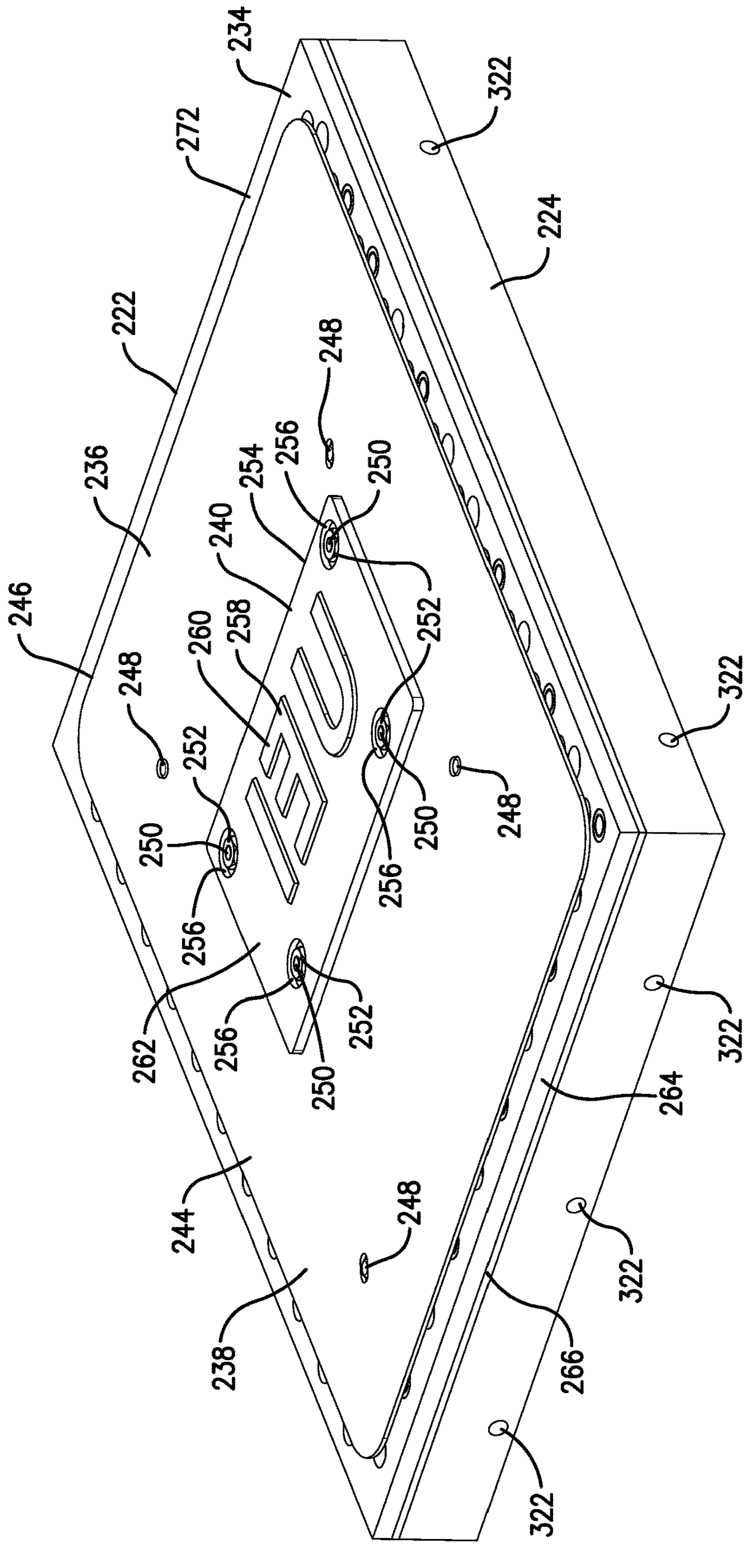
Figure 24:
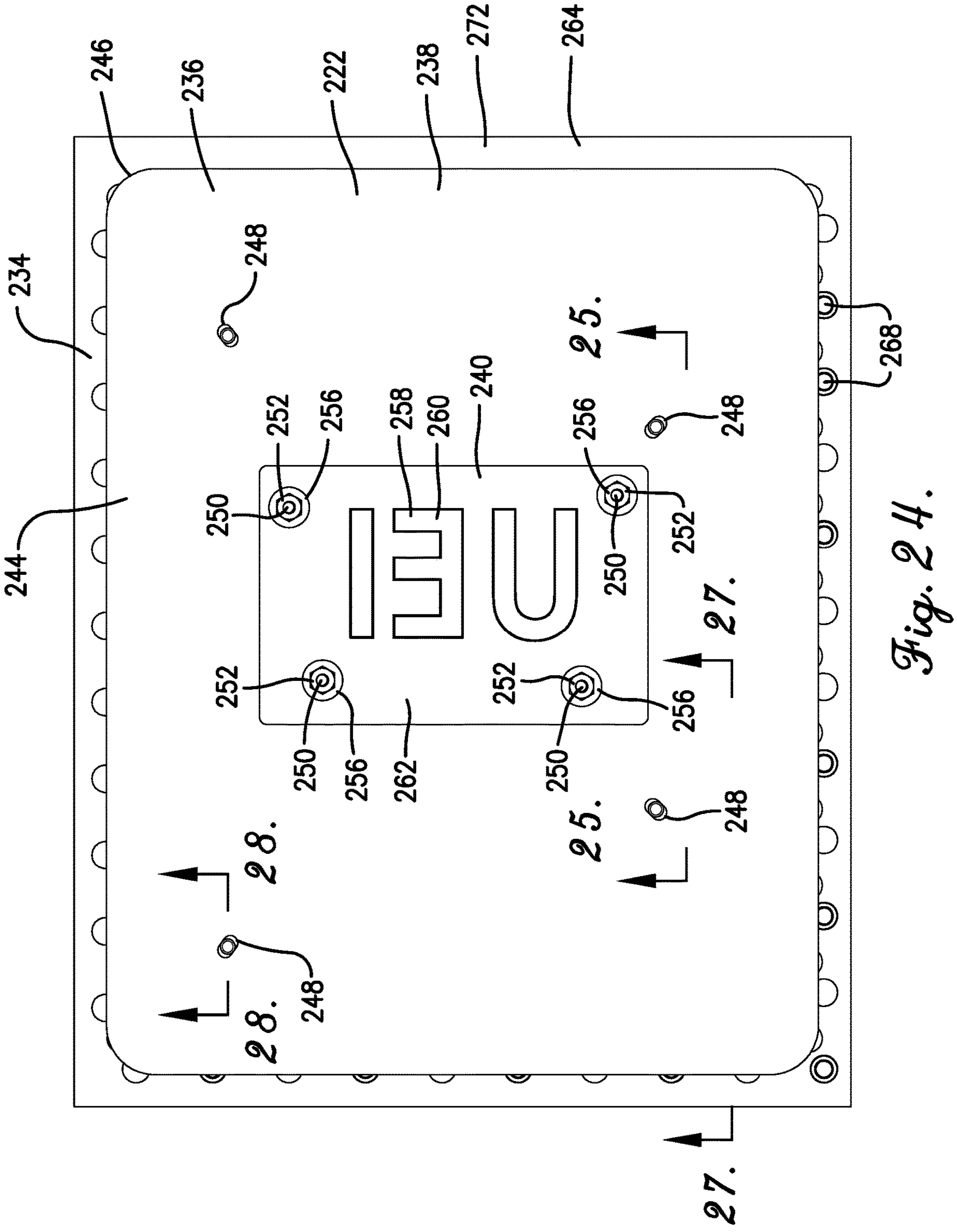
Figure 25:
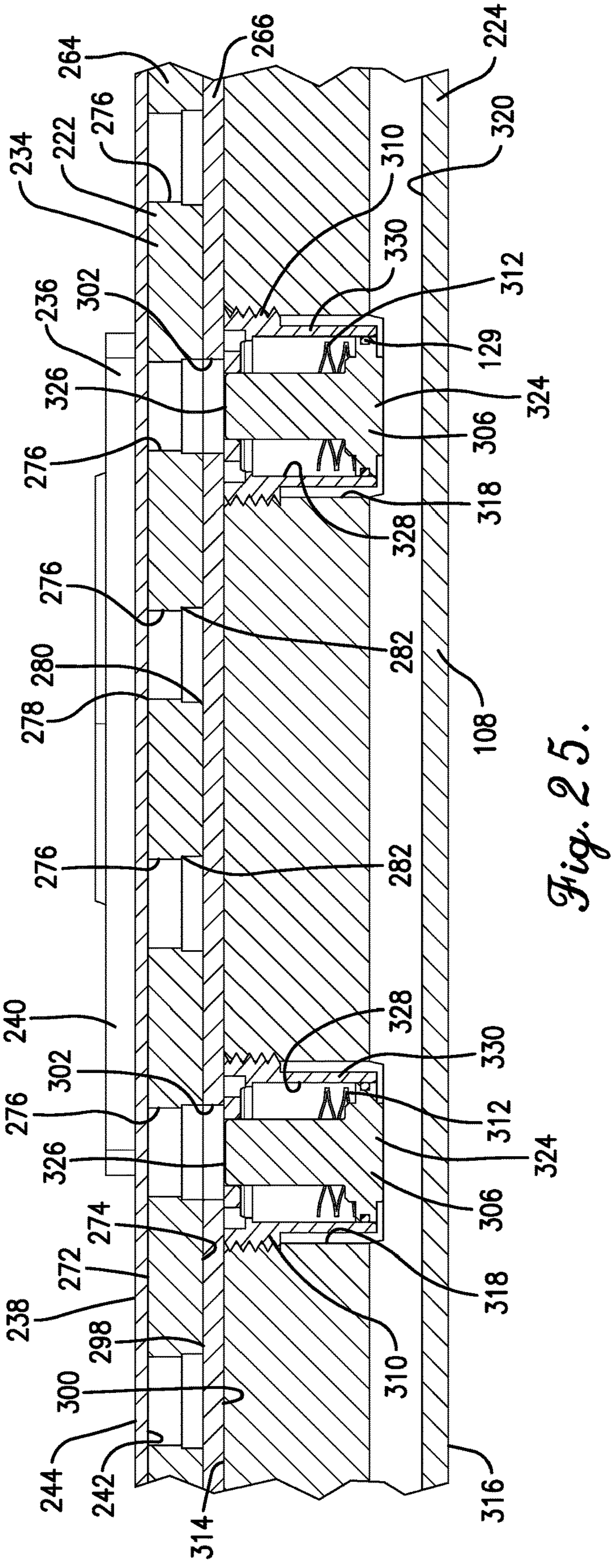
Figure 26:
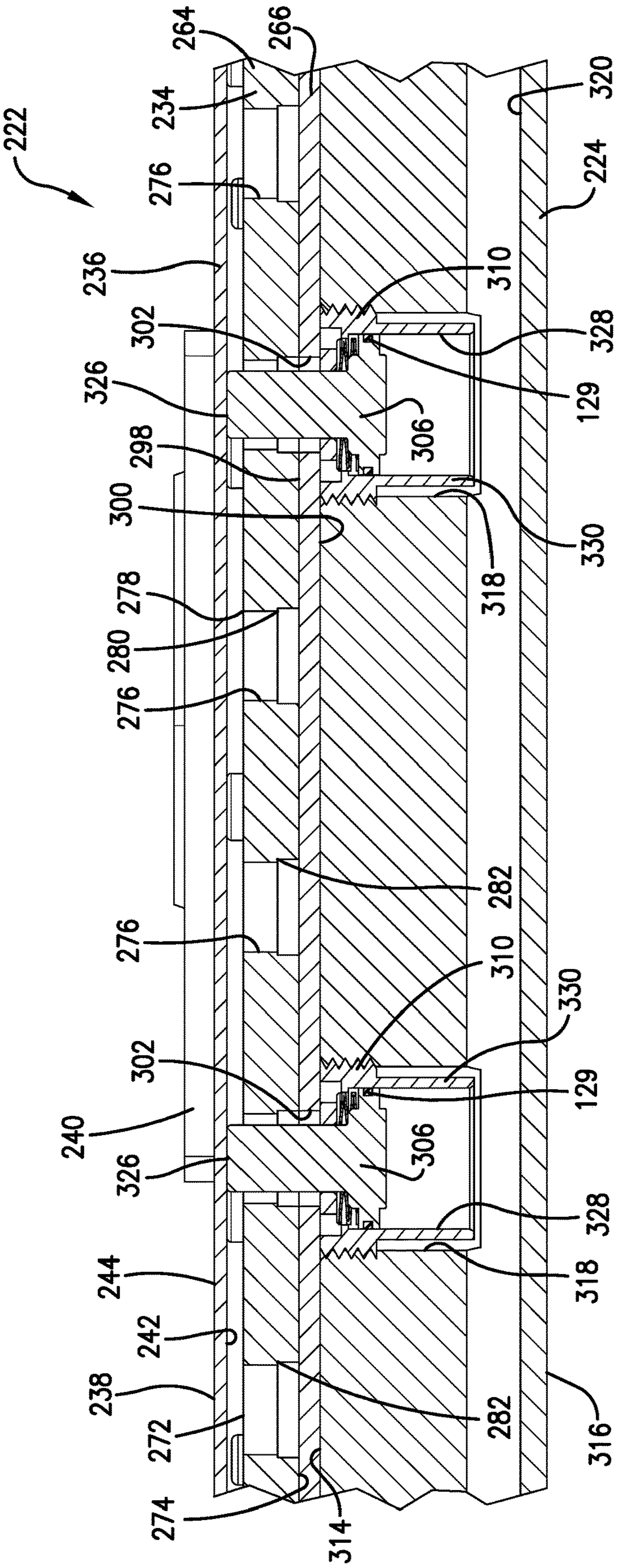
Figure 27:
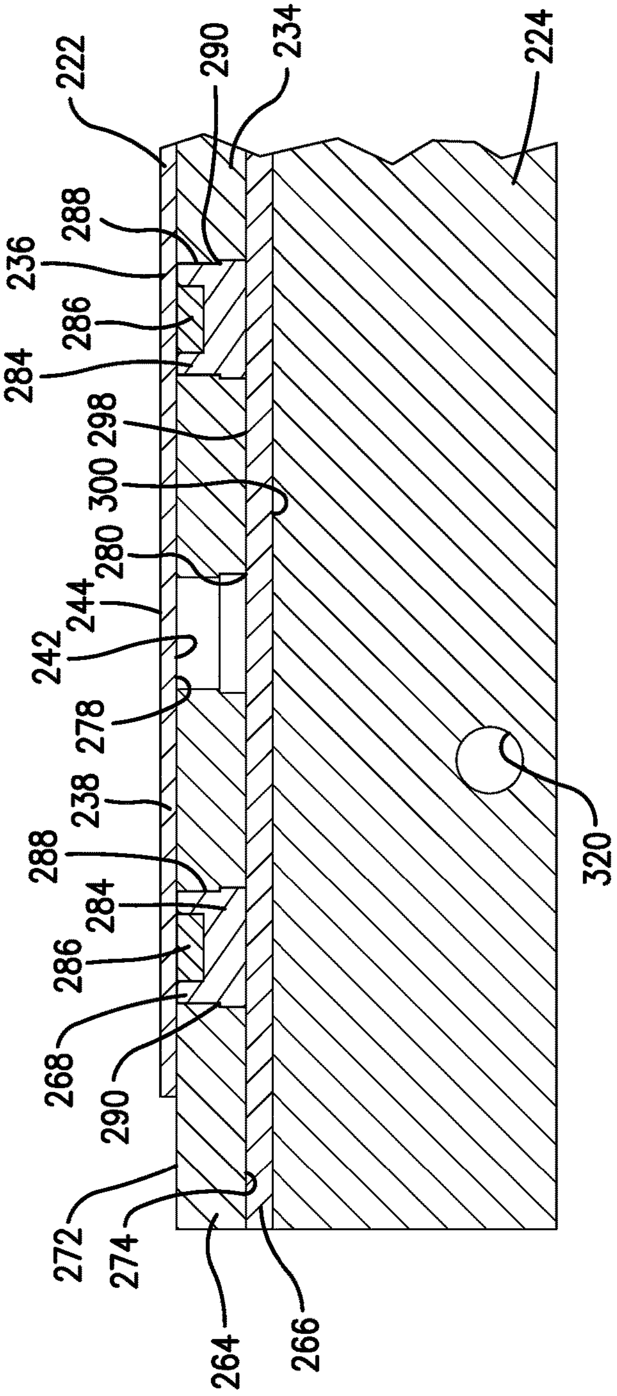
Figure 28:
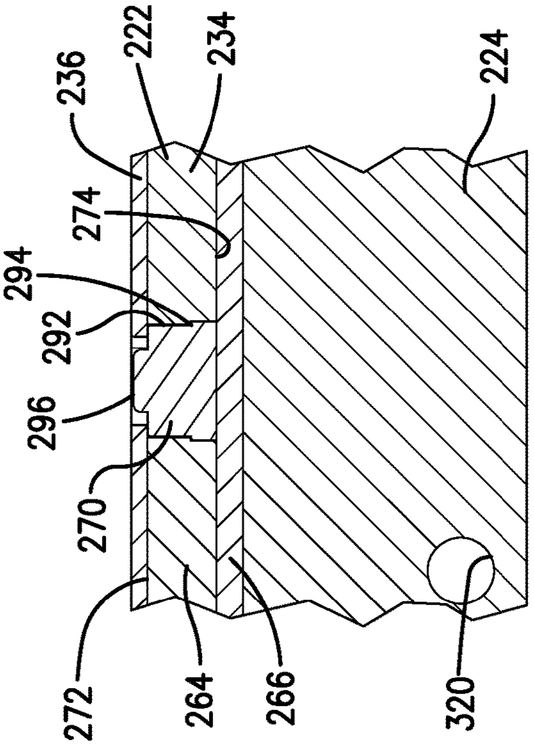
Figure 29:
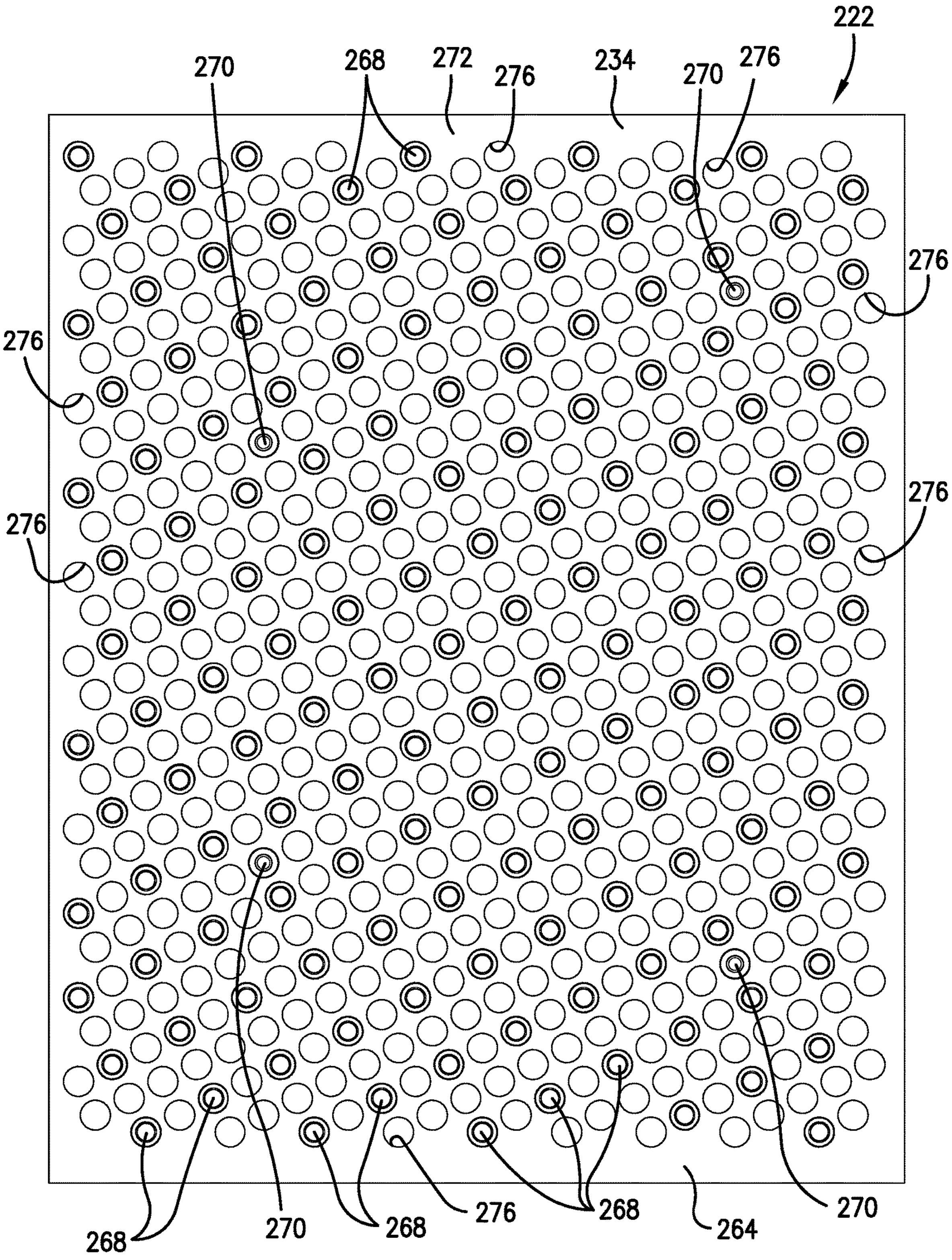
Figure 30:
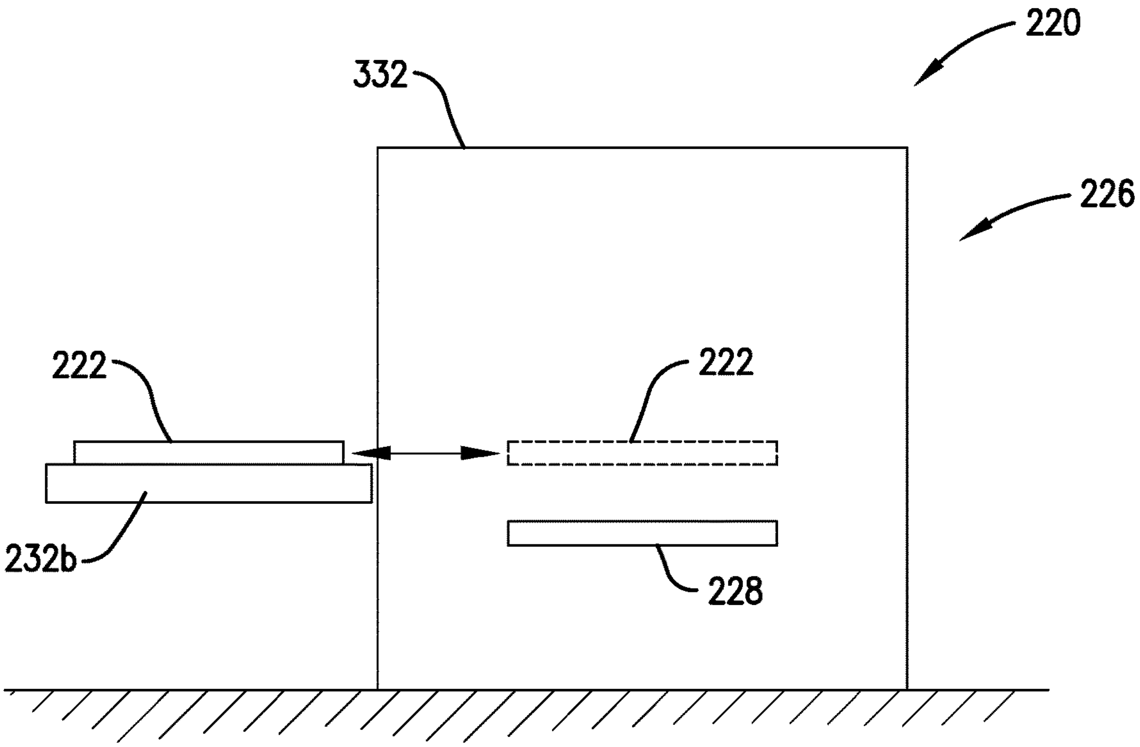
Figure 31:
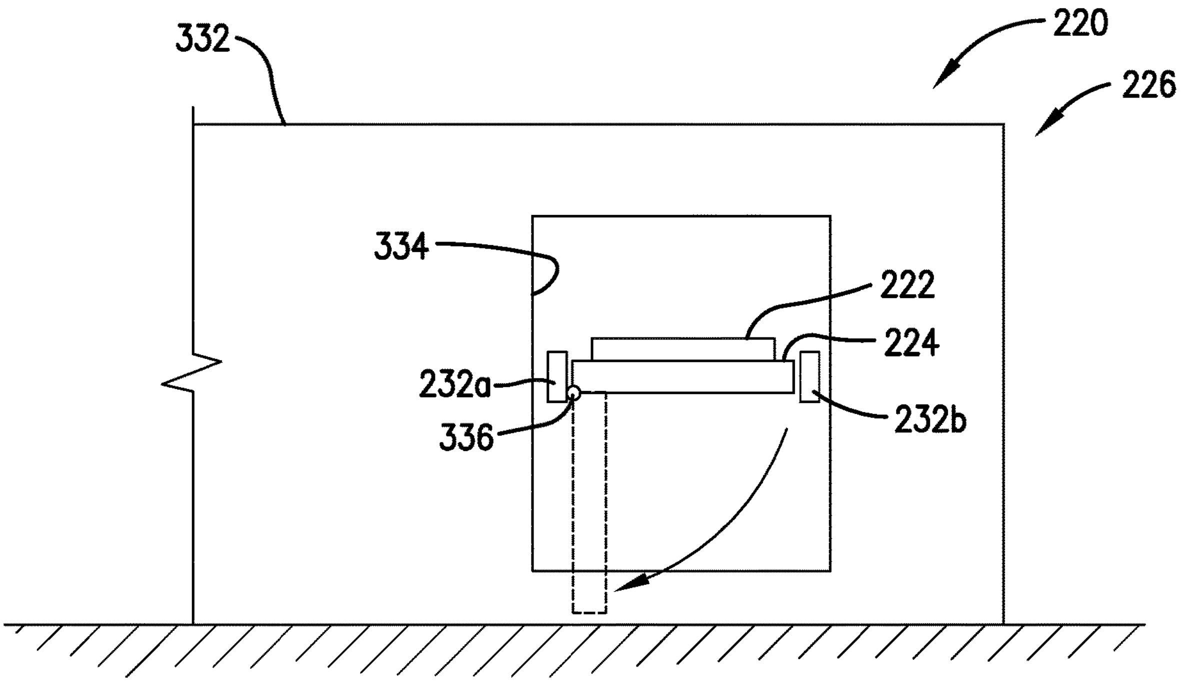
Figure 32:
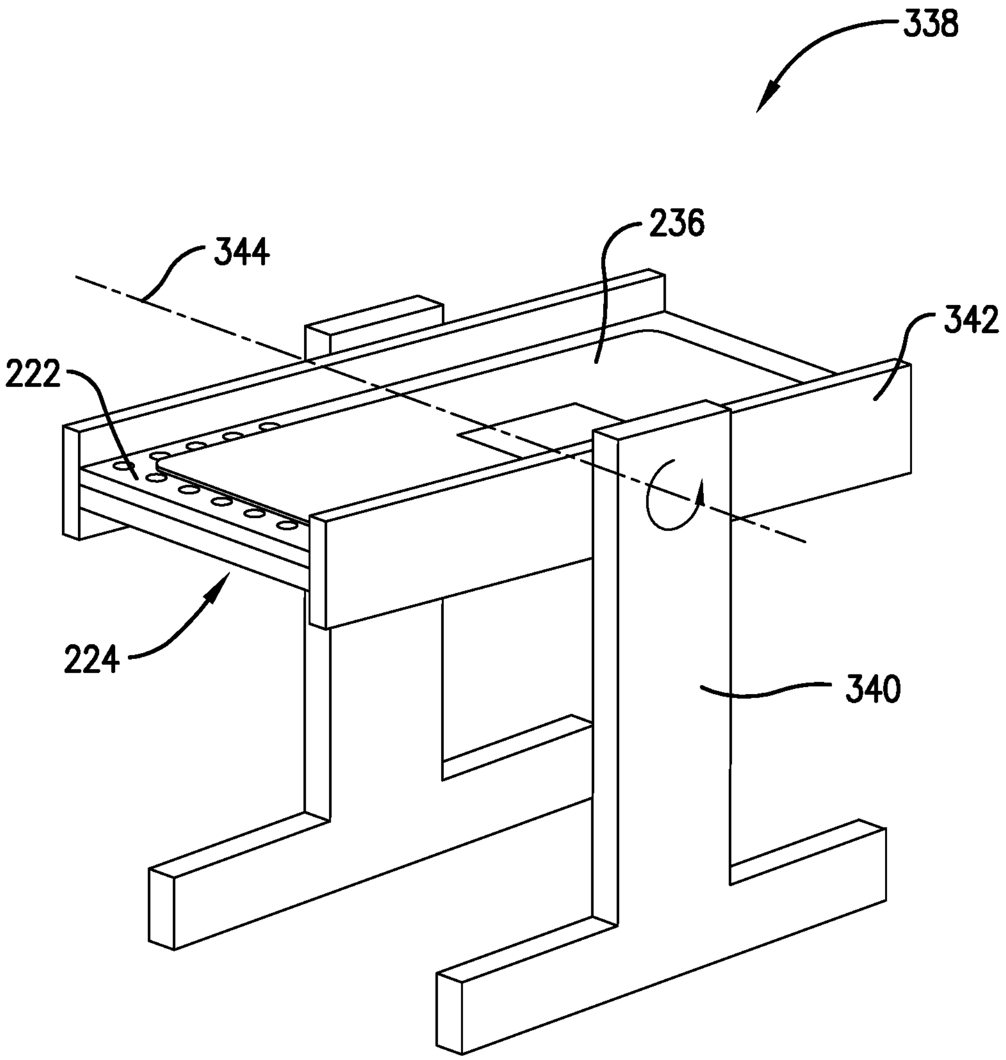

FIG. 7*a* is a fragmentary enlarged top view of the graphic arts die assembly and lift mechanism similar to FIG. 7, but enlarged to show magnetic plugs and an alignment plug of the chase assembly, with the alignment plug received by an alignment slot presented by the die support plate, and further showing one of the pistons in alignment with a lift slot presented by the die support plate;

FIG. 8 is a fragmentary cross section of the graphic arts die assembly and lift mechanism taken along line 8-8 in FIG. 7, showing retracted pistons of the lift mechanism in alignment with lift bores of the chase assembly;

FIG. 9 is a fragmentary cross section of the graphic arts die assembly and mechanism similar to FIG. 8, but showing the pistons shifted into an extended position where the pistons extend through the lift bores to position the die plate assembly in a position spaced away from the chase assembly, with one of the pistons being received by a corresponding lift slot presented by the die support plate;

FIG. 10 is a fragmentary cross section of the graphic arts die assembly and lift mechanism taken along line 10-10 in FIG. 7, showing magnetic plugs of the chase assembly in magnetic engagement with the die plate assembly;

FIG. 11 is a fragmentary cross section of the graphic arts die assembly and mechanism similar to FIG. 10, but showing the pistons shifted into the extended position so that the die plate assembly is spaced away from the chase assembly;

FIG. 12 is a fragmentary cross section of the graphic arts die assembly and lift mechanism taken along line 12-12 in FIG. 7*a*, showing an alignment plug of the chase assembly in alignment with an alignment slot of the die plate assembly;

FIG. 13 is an upper exploded perspective of the graphic arts counter assembly shown in FIG. 1, showing a platen assembly exploded from a counter plate assembly, and further showing the lift mechanism located below the graphic arts die assembly;

FIG. 14 is a lower exploded perspective of the graphic arts counter assembly and lift mechanism similar to FIG. 13, but taken from the opposite side thereof;

FIG. 15 is an upper perspective of the graphic arts counter assembly and lift mechanism shown in FIGS. 13 and 14, showing the counter plate assembly mounted on the platen assembly and the platen assembly positioned on the lift mechanism, further showing four (4) counters and a counter support plate of the counter plate assembly, with one of the counters and an underlying tape exploded from the counter support plate;

FIG. 16 is an upper perspective of the graphic arts counter assembly and lift mechanism shown in FIGS. 13-15, showing the counter plate assembly spaced above the platen assembly;

FIG. 17 is a top view of the graphic arts counter assembly and lift mechanism shown in FIGS. 13-15, showing the counter plate assembly aligned with and mounted on the platen assembly;

FIG. 17*a* is a fragmentary enlarged top view of the graphic arts counter assembly and lift mechanism similar to FIG. 7, but enlarged to show magnetic plugs and an alignment plug of the platen assembly, with the alignment plug received by an alignment slot presented by the counter support plate, and further showing one of the pistons in alignment with a lift slot presented by the counter support plate;

FIG. 18 is a fragmentary cross section of the graphic arts counter assembly and lift mechanism taken along line 18-18 in FIG. 17, showing retracted pistons of the lift mechanism in alignment with lift bores of the platen assembly;

FIG. 19 is a fragmentary cross section of the graphic arts counter assembly and lift mechanism taken along line 19-19 in FIG. 17, showing magnetic plugs of the chase assembly in magnetic engagement with the counter plate assembly;

FIG. 20 is a fragmentary cross section of the graphic arts counter assembly and lift mechanism taken along line 20-20 in FIG. 17*a*, showing an alignment plug of the platen assembly in alignment with an alignment slot of the counter plate assembly;

FIG. 21 is a fragmentary perspective of a press and manifold constructed in accordance with a second preferred embodiment of the present invention, with the press including a graphic arts die assembly with a chase assembly and a die plate assembly, showing the chase assembly exploded from the die plate assembly, and further showing the manifold located below the graphic arts die assembly;

FIG. 22 is a lower exploded perspective of the graphic arts die assembly and manifold similar to FIG. 21, but taken from the opposite side thereof;

FIG. 23 is an upper perspective of the graphic arts die assembly and manifold shown in FIGS. 21 and 22, showing the die plate assembly mounted on the chase assembly and the chase assembly positioned on the manifold;

FIG. 24 is a top view of the graphic arts die assembly and manifold shown in FIGS. 21-23;

FIG. 25 is a fragmentary cross section of the graphic arts die assembly and manifold taken along line 25-25 in FIG. 24, showing lift pins of the manifold in a retracted position;

FIG. 26 is a fragmentary cross section of the graphic arts die assembly and manifold similar to FIG. 25, but showing the lift pins in an extended position to move the die plate assembly away from the chase assembly;

FIG. 27 is a fragmentary cross section of the graphic arts die assembly and manifold taken along line 27-27 in FIG. 24, showing magnetic plugs of the chase assembly mounted in corresponding bores of a chase and held therein by a backing plate;

FIG. 28 is a fragmentary cross section of the graphic arts die assembly and manifold taken along line 28-28 in FIG. 24, showing an alignment plug of the chase assembly mounted in a corresponding bore of the chase and held therein by a backing plate, with the alignment plug being received in a slot presented by the die plate assembly;

FIG. 29 is a top view of the chase assembly shown in FIGS. 21-28, showing magnetic plugs and alignment plugs mounted in corresponding bores of the chase;

FIG. 30 is a schematic side elevation of the press shown in FIG. 1, showing a press housing and support arms attached to the press housing, and further showing the graphic arts die assembly supported by the support arms;

FIG. 31 is a schematic front elevation of the press shown in FIG. 30, showing the manifold attached to the support arms to support the graphic arts die assembly between the support arms, with the manifold being swingable to a stowed position to facilitate user access to the press; and FIG. 32 is a schematic perspective of a freestanding table used to support the manifold and graphic arts die assembly.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

A flat bed press 20 (shown schematically in FIG. 1) is used to perform hot foil stamping, embossing, or debossing (or any combination thereof) of a substrate. As will be described in greater detail, a graphic arts die assembly 22 and a graphic arts counter assembly 24 are configured to be setup quickly and efficiently for use as part of the press 20. During setup, the construction of the graphic arts die assembly 22 and graphic arts counter assembly 24 enable fine adjustment of die position along a lateral direction.

As will be discussed, a lift mechanism 26 cooperates with the die assembly 22 and counter assembly 24 to facilitate the die setup process and the counter setup process (see FIGS. 2-4 and 13-15). Also, as will be described in detail, the die assembly 22 and the counter assembly 24 include different embodiments of a graphic arts plate assembly that can be supported by corresponding magnetic support structures in the press 20. The press 20 preferably includes the graphic arts die assembly 22, the graphic arts counter assembly 24, and a reciprocating support structure 30.

The illustrated press 20 can comprise either a sheet fed press or a web press without departing from the scope of the present invention. The graphic arts counter assembly 24 is mounted to the support structure 30 for reciprocating movement relative to the graphic arts die assembly 22 (see FIG. 1). Consistent with the principles of the present invention, the assemblies 22 and 24 can be variously configured to provide foil stamping, embossing, debossing, or any combination thereof. The counter assembly 24 will be discussed in greater detail below.

Graphic Arts Die Assembly

Turning to FIGS. 2-12, the graphic arts die assembly 22 is configured to be brought into engagement with the graphic arts counter assembly 24 to provide foil stamping, embossing, debossing, or any combination thereof. The graphic arts die assembly 22 preferably includes a chase assembly 34 and a die plate assembly 36. The die plate assembly 36 comprises one preferred embodiment of a graphic arts plate assembly supported by a magnetic support structure (with the support structure preferably being in the form of the chase assembly 34).

Figure 2:
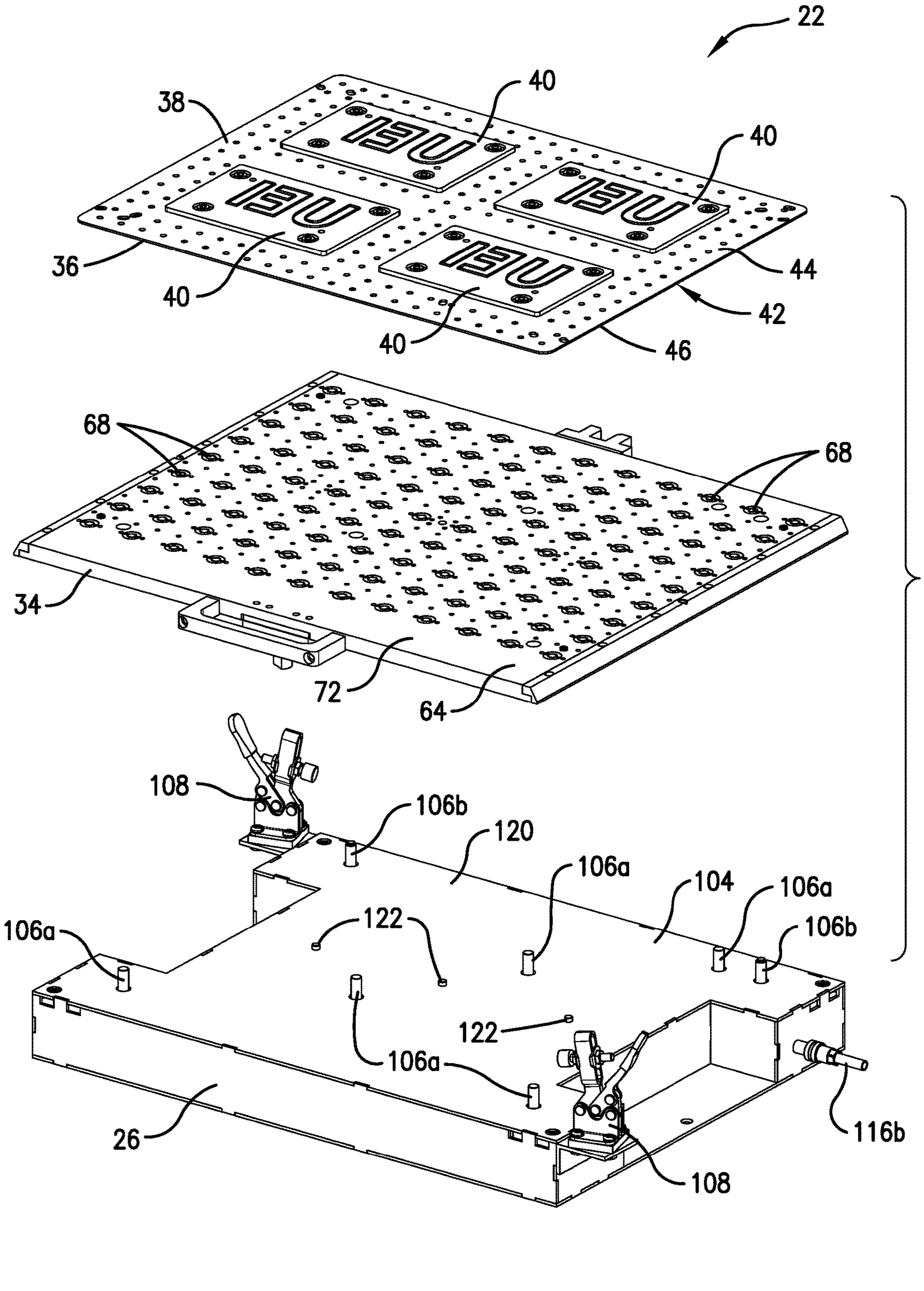
FIG. 2 is an upper exploded perspective of the graphic arts die assembly shown in FIG. 1, showing a chase assembly exploded from a die plate assembly, and further showing a lift mechanism located below the graphic arts die assembly.
Figure 4:
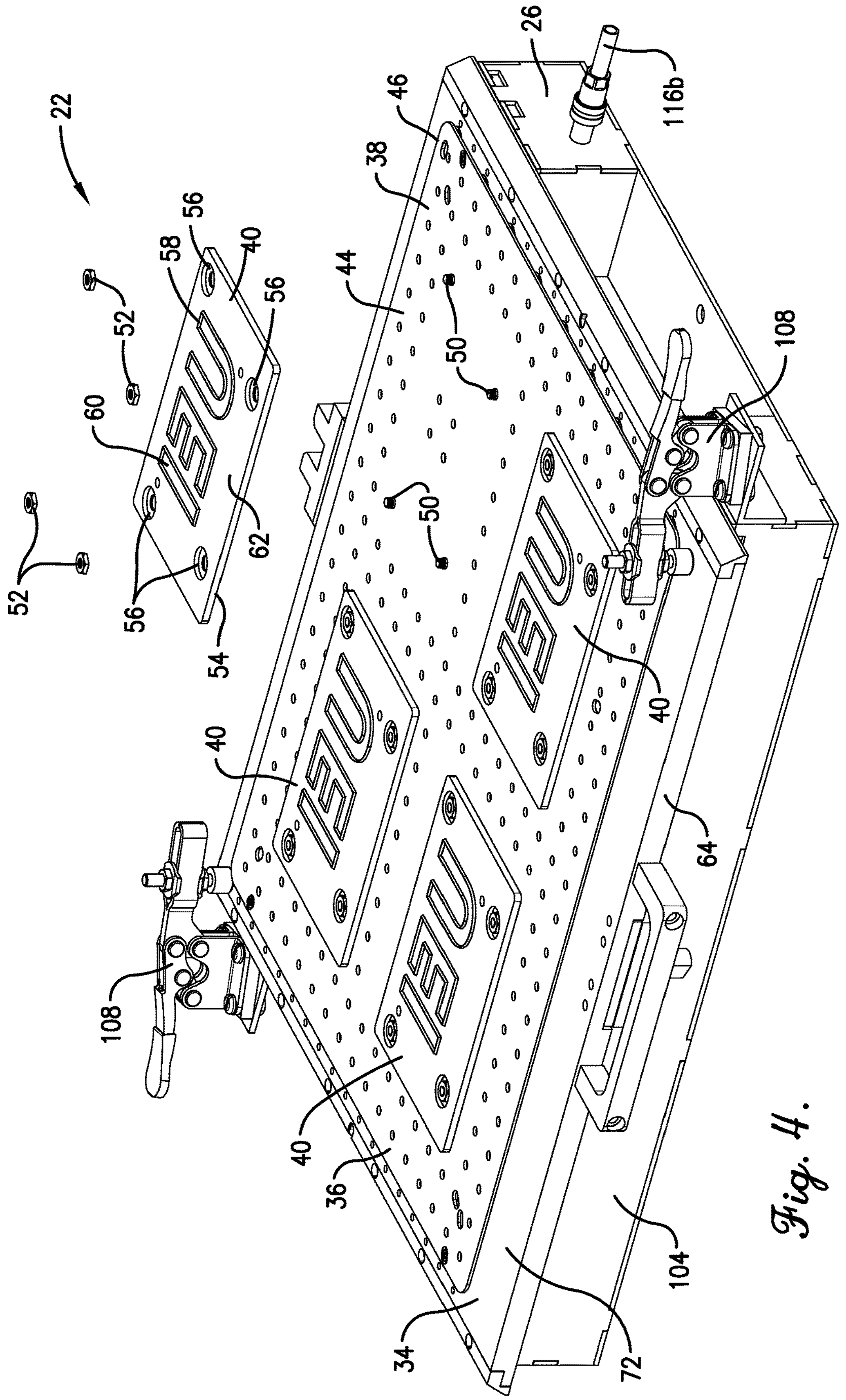
FIG. 4 is an upper perspective of the graphic arts die assembly and lift mechanism shown in FIGS. 2 and 3, showing the die plate assembly mounted on the chase assembly and the chase assembly removably secured to the lift mechanism with clamps, and further showing four (4) dies and a die support plate of the die plate assembly, with one of the dies exploded from the die support plate.

The die plate assembly 36 preferably includes a die support plate 38 and graphic arts dies 40 (see FIGS. 2 and 4). The die support plate 38 presents a chase-engaging surface 42, a die-receiving surface 44, a perimeter edge 46, alignment slots **48*a*, and lift slots 48*b* (see FIGS. 7, 7*a*, 8, and 12). The alignment slots 48*a* and lift slots 48*b* are interiorly spaced within the edge 46. The die support plate 38 is configured to removably support the dies 40 on the surface 44**.

The illustrated embodiment includes four (4) dies 40. Although not depicted, it will also be appreciated that the die support plate 38 could support an alternative number of dies, such as fewer than four (4) dies (e.g., a single die) or greater than four (4) dies, in a fixed relationship relative to one another. One preferred embodiment of an alternative die support plate is disclosed in U.S. Pat. No. 7,096,709, issued Aug. 29, 2006, entitled GRAPHIC ARTS DIE AND SUPPORT PLATE ASSEMBLY, which is hereby incorporated in its entirety by reference herein.

The die support plate 38 is preferably ferromagnetic to permit magnetic engagement between the die support plate 38 and the chase assembly 34. More preferably, the die support plate 38 is formed entirely of a ferromagnetic material, such as carbon steel. In alternative embodiments, the die support plate 38 could include a non-ferromagnetic material and at least some ferromagnetic material for magnetic engagement with the chase assembly 34. Although carbon steel is a preferred material for the die support plate, the die support plate could alternatively or additionally include one or more alternative materials (such as stainless steel or aluminum) without departing from the principles of the present invention.

Preferably, the die plate assembly 36 also includes a plurality of threaded studs 50 welded to the die support plate 38 and projecting from the surface 44 (see FIG. 4). The die plate assembly 36 further includes a plurality of threaded nuts 52 removably threaded onto the studs 50 (see FIGS. 4 and **7*a*). The studs 50 and nuts 52 serve to secure the graphic arts dies 40 onto the die support plate 38**. Consistent with the principles of the present invention, an alternative die support plate could be provided. Features of alternative die support plate structures are disclosed in the above-incorporated '709 patent.

Turning to FIGS. 4 and 7, each graphic arts die 40 preferably comprises an engraved graphic arts die, although the principles of the present invention are also applicable where the graphic arts die 40 comprises a die-cutting die. As used herein, the term "engraved" refers to die engraving by photo-etching, manual engraving, or machining (e.g., conventional milling or laser machining).

Each graphic arts die 40 preferably presents a machined edge 54, counterbored holes 56, and an engraved surface 58. The edge 54 is machined to preferably comprise a substantially vertical edge surface. However, the edge 54 could comprise a beveled edge (e.g., where the edge is configured to be engaged by a toggle device).

Each engraved surface 58 is preferably formed by engraving the respective graphic arts die 40, with the engraved surface 58 defining an image indicia 60. The graphic arts die 40 also presents a generally planar background surface 62 that surrounds the engraved surface 58.

As discussed above, various conventional engraving techniques, including those disclosed in the above-incorporated '709 patent, can be used to form the engraved surface 58. However, the principles of the present invention are applicable where the surface 58 is alternatively constructed to provide the indicia 60. While the illustrated surface 58 is provided for debossing, the graphic arts die 40 could alternatively have features for foil stamping, embossing, die-cutting, or any combination thereof.

The counterbored holes 56 are configured to receive the studs 50, with the nuts 52 being received by the counterbore so that the nuts 52 do not project out of the holes 56 and beyond the background surface 62. The holes 56 are preferably located about and spaced from the indicia 60. Additional features of a method for manufacturing the graphic arts die 40 to provide relative positioning and alignment between holes 56 and indicia 60 are disclosed in the above-incorporated '709 patent. Although the depicted holes 56 have a round profile shape, it will be appreciated that one or more dies could have alternatively shaped holes to receive fasteners. For instance, in alternative embodiments, the die could present holes with a generally square profile shape (e.g., to enable convenient die adjustment relative to a support plate). Additional details of such alternative die embodiments are disclosed in U.S. Provisional Application No. 62/549,776, filed Aug. 24, 2018, entitled APPARATUS AND METHOD FOR ADJUSTING GRAPHIC ARTS DIE PLATE ON CARRIER, which is hereby incorporated in its entirety by reference herein.

Each graphic arts die 40 preferably is formed of a non-ferrous metal and, more preferably, is formed of brass alloy. However, it is also within the scope of the present invention where the graphic arts die 40 is formed wholly or partly of steel, magnesium, zinc, polymer, copper alloy, or a composite material, such as fiberglass.

Again, the studs 50 and nuts 52 serve to secure each graphic arts die 40 onto the die support plate 38. The studs 50 and nuts 52 are undersized relative to the holes 56 to permit fine adjustment of the lateral positioning of the die 40 relative to the die support plate 38. When multiple dies are mounted onto a common die support plate, the dies are preferably secured by studs and nuts that permit lateral positioning of the dies to be adjusted relative to one another.

Referring again to FIGS. 2-12, the chase assembly 34 is a preferred embodiment of a magnetic support structure for supporting a graphic arts plate assembly. In the illustrated embodiment, the chase assembly 34 preferably removably supports the die plate assembly 36. As will be explained in detail, the die plate assembly 36 is preferably secured to the chase assembly 34 magnetically. Preferably, the chase assembly 34 includes a chase 64, alignment inserts 66, magnetic plugs 68, and alignment plugs 70 (see FIGS. 2, 3, and 10-12).

The chase 64 is unitary and presents opposite chase surfaces 72,74 and an array of spaced lift bores 76*a* and threaded holes 76*b* (see FIGS. 7*a*, 8, and 10). Some of the lift bores 76*a* are configured to be aligned with corresponding slots 48*b* (see FIG. 7*a*). The lift bores 76*a* are also configured to removably receive pistons of the lift mechanism, as will be described.

The chase 64 also presents magnet recesses 78 and alignment recesses 80 (see FIGS. 7*a* and 10-12). The magnet recesses 78 are defined by corresponding walls with threaded sections 78*a* and annular shoulders 78*b* (see FIG. 12).

However, the magnet recesses could be alternatively configured and/or positioned without departing from the scope of the present invention. For instance, an alternative magnet recess could comprise a through hole (extending continuously between the surfaces 72 and 74).

The alignment recesses 80 are defined by corresponding walls with threaded sections 80*a* (see FIG. 12). Each illustrated alignment recess 80 preferably comprises a through hole that extends completely through the chase 64 (to intersect both surfaces 72 and 74). However, the alignment recess could be alternatively shaped and/or positioned. In one alternative embodiment, the alignment recess could have a form identical or similar to the magnet recess 78. As will be discussed, the recesses 78 and 80 removably receive respective plugs 68 and 70.

For some aspects of the present invention, the chase 64 could use or include alternative features to mount one or more dies thereon. For instance, the threaded holes 76*b* are configured to receive threaded fasteners to attach one or more dies directly to the chase with the threaded fasteners (e.g., as is customary with narrow web chases). Although not shown, the holes 76*b* present internal threads to threadably receive corresponding fasteners.

Some presses could have an alternative chase that is devoid of the apertures found in conventional honeycomb chases. For such a press, a new chase can be provided with the desired number and arrangement of bores and/or threaded attachment holes. Alternatively, the preexisting chase can be modified to provide the desired number and arrangement of bores and/or threaded attachment The chase 64 is preferably formed of aluminum, but could be formed of an alternative material (such as stainless steel, carbon steel, synthetic resin, etc.) without departing from the principles of the present invention. It will also be understood that the chase 64 can be formed of a ferromagnetic material or a non-ferromagnetic material. It has been determined that a ferromagnetic chase construction does not interfere with the use of the chase assembly 34 (e.g., a ferromagnetic chase does not interfere with the insertion and removal of magnetic plugs 68 relative to bores 76).

Figure 3:
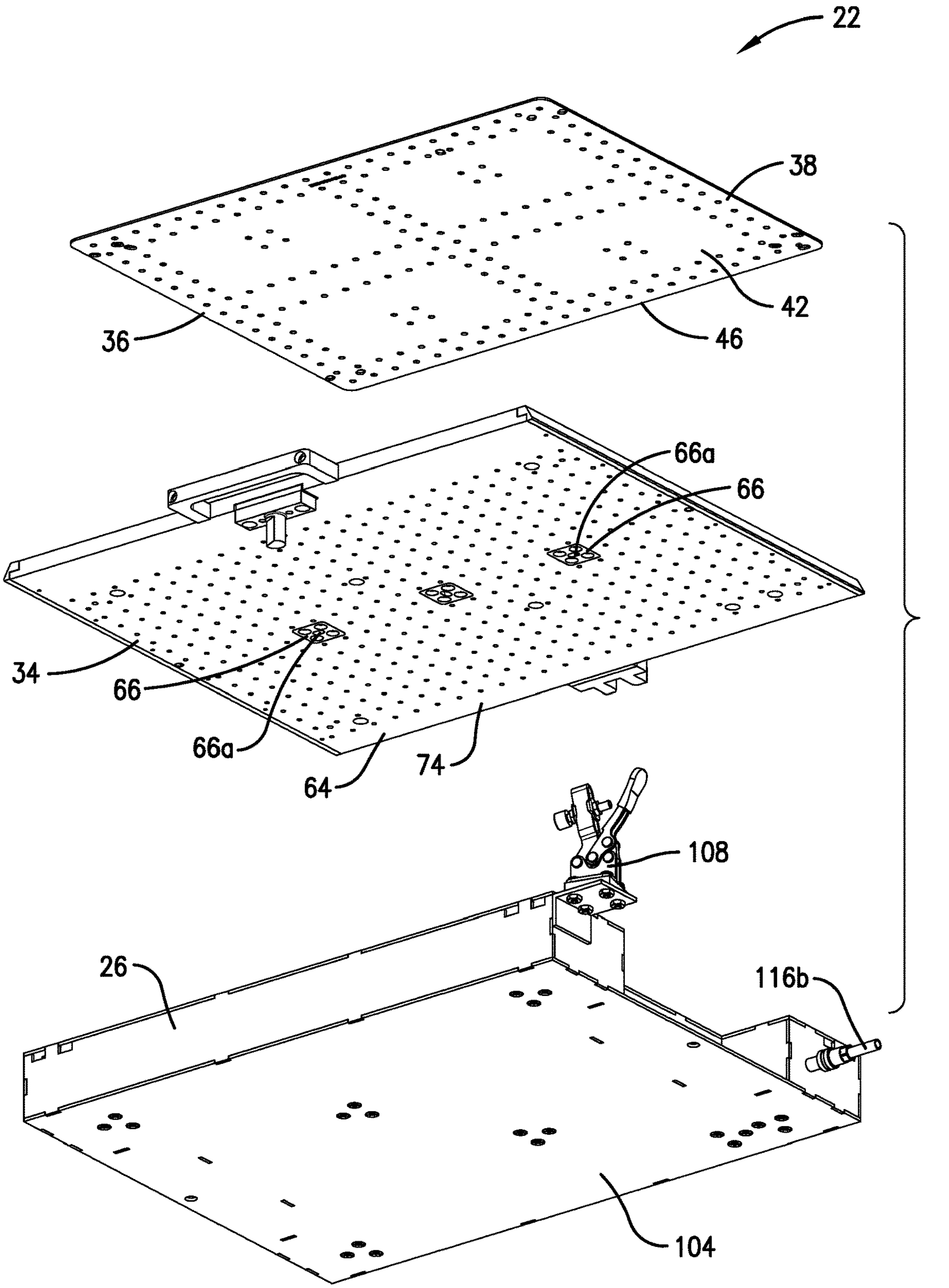
FIG. 3 is a lower exploded perspective of the graphic arts die assembly and lift mechanism similar to FIG. 2, but taken from the opposite side thereof.

The alignment inserts 66 each preferably comprise a unitary plate that presents a slot 66*a* (see FIGS. 3, 10, and 11). The slot 66*a* is shaped to receive a stud of the lift mechanism 26, as will be discussed. The inserts 66 are removably secured by fasteners (not shown) within pockets presented by the chase surface 74.

Figure 5:
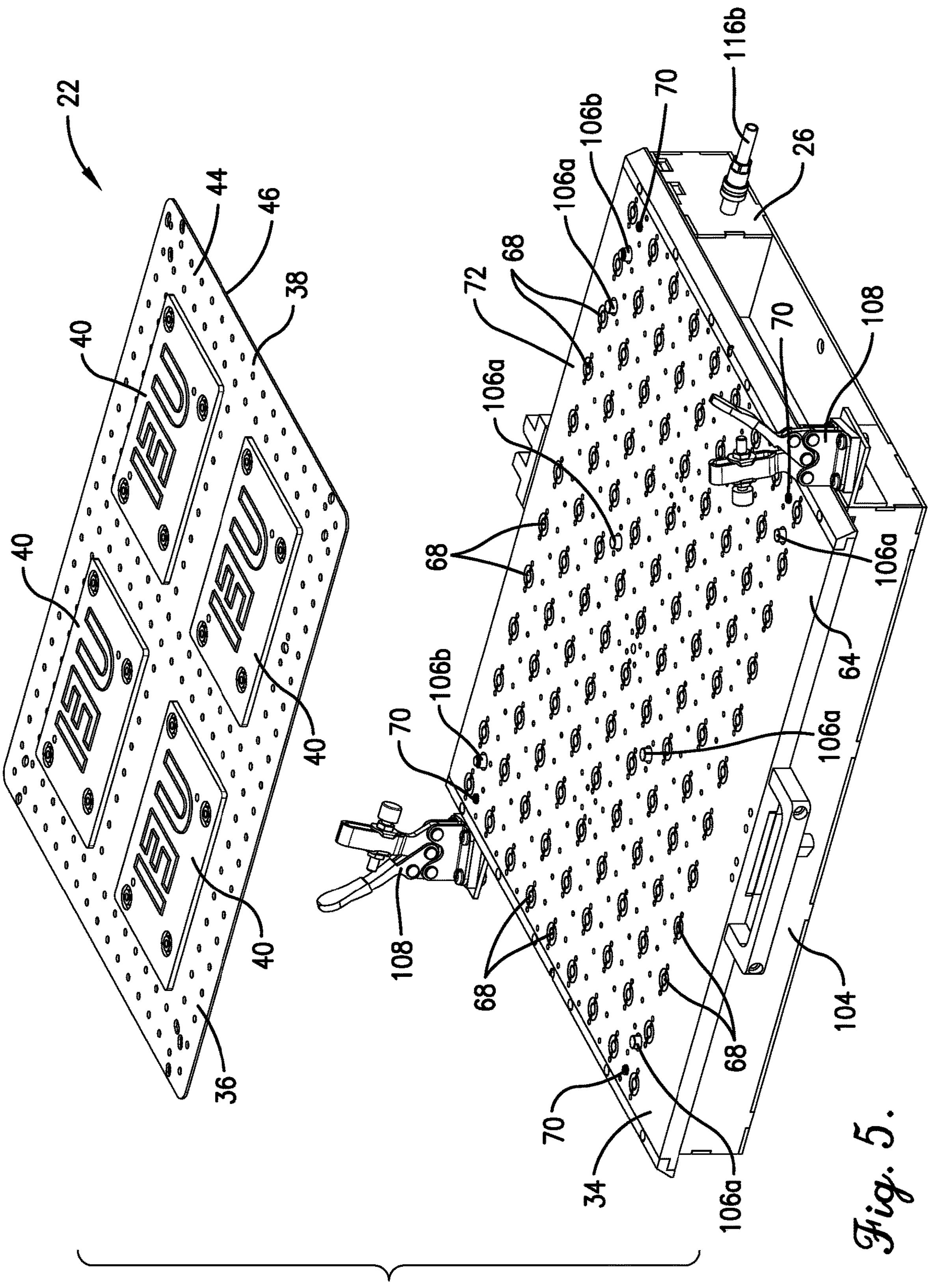
FIG. 5 is an upper perspective of the graphic arts die assembly and lift mechanism shown in FIGS. 2-4, showing the die plate assembly spaced above the chase assembly.
Figure 6:
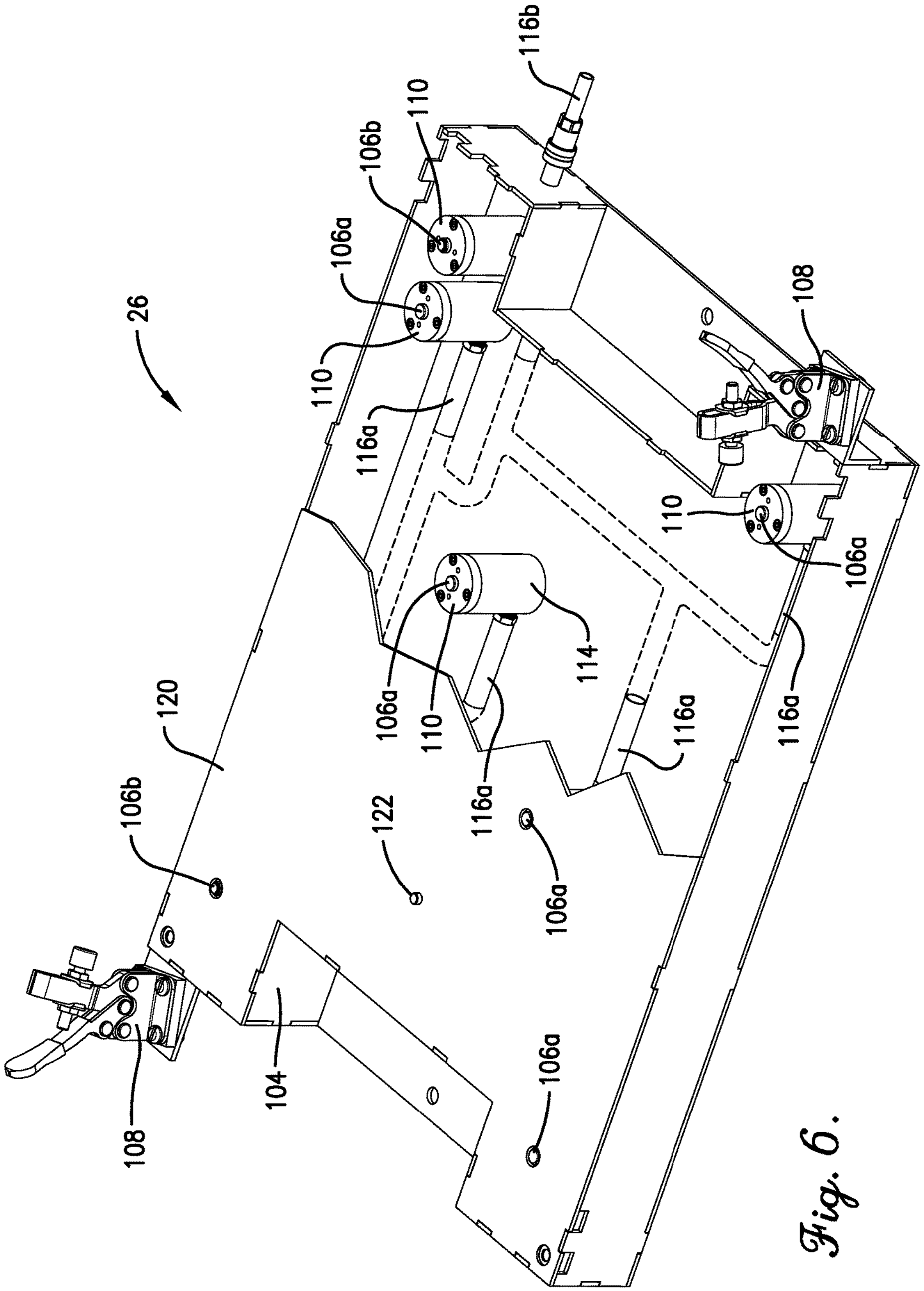
FIG. 6 is a fragmentary perspective of the lift mechanism shown in FIGS. 2-5, showing, among other things, a frame, cylinders, and pistons of the lift mechanism, with the pistons in a retracted position.

Turning to FIGS. 5, 7*a*, and 12, the magnetic plugs 68 are operable to magnetically and removably hold the die plate assembly 36 in engagement with the chase assembly 34. Each magnetic plug 68 preferably includes a body 84 and a permanent magnet 86 fixed to the body 84 (see FIG. 12). The magnet 86 presents an exposed magnet surface 86*a*.

The illustrated body 84 presents peripheral threads 88 and a flange 90 (see FIG. 12). The body 84 also presents an upper surface 84*a*, a socket 84*b* to receive the magnet 86, and holes 84*c* (see FIG. 7*a*) to be engaged by a wrench (not shown). The depicted magnetic plug 68 is sized and shaped to be threaded into and out of a corresponding recess 78.

When the magnetic plug 68 is located in the recess 78, the flange 90 is operable to engage the shoulder 80*b* and restrict movement of the magnetic plug 68 into the recess 78. It is also within the ambit of the present invention to alternatively secure one or more of the magnetic plugs to the chase. For instance, in some alternative embodiments, one or more magnetic plugs could be press fit or adhered within an opening of the chase.

The illustrated magnet surfaces 86*a* and chase surface 72 are preferably substantially coplanar with one another. In this manner, the surfaces 72,86*a* cooperatively form a smooth and continuous surface to engage the die plate assembly 36. However, in some alternative embodiments, the magnet surfaces 86*a* could be offset from the chase surface 72. For example, according to some aspects of the present invention, the magnets may be recessed below the chase surface 72 and covered by a portion of the chase body such that the magnetic field must pass through the chase body to secure the die plate assembly 36 in place.

The magnetic plugs 68 are preferably arranged and provided in number to securely hold the die plate assembly 36 in engagement with the chase assembly 34. For example, the magnetic connection between the assemblies 34 and 36 is sufficient to ensure the die plate assembly 36 remains held against chase assembly 34 even if the graphic arts die assembly 22 is inverted (with the die plate assembly 36 below the chase assembly 34). However, the principles of the present invention are equally applicable where the chase assembly 34 includes an alternative number of magnetic plugs 68 (e.g., the chase assembly 34 could use fewer plugs 68). Furthermore, one or more of the magnetic plugs 68 could be alternatively arranged within the recesses 78 of the chase 64. Numbering and arrangement can depend on the strength of the magnetic plugs, the weight of the die plate assembly 36, etc.

Preferably, the permanent magnets 86 are formed of a high-temperature samarium-cobalt material that can withstand customary hot foil stamping temperatures (ranging from about one hundred thirty degrees Fahrenheit (130° F.) to about four hundred degrees Fahrenheit (400° F.)) without becoming demagnetized. However, it is also within the ambit of the present invention for the magnets 86 to comprise an alternative high-temperature rare earth magnet material. The body 84 preferably comprises a low carbon steel material, but could include an alternative material (such as stainless steel, aluminum, synthetic resin, etc.) without departing from the scope of the present invention. Each magnet 86 is preferably adhered to the body 84 with an adhesive material (not shown), although the magnet 86 and body 84 could be alternatively fixed to one another. In yet further alternative embodiments, one or more of the magnets may be secured directly to the chase body such that the corresponding bodies are eliminated altogether.

Although the illustrated embodiment provides the chase 64 with magnets 86, certain aspects of the present invention contemplates alternative means for removably and magnetically interconnecting the chase assembly 34 and the die plate assembly 36. For example, in some alternative embodiments the die plate assembly may be provided with magnets and the chase assembly may be formed at least in part of ferromagnetic material. Certain aspects of the present invention may also comprise both assemblies having magnets. With this alternative, the magnet of each assembly may be associated with a ferromagnetic portion or insert of the other assembly.

Turning to FIGS. 7*a* and 12, the alignment plugs 70 are operable to locate the die plate assembly 36 on the chase assembly 34 and restrict relative lateral movement between the assemblies 34 and 36. Each alignment plug 70 comprises a pin and presents a threaded body 92 and a head 94, with the head 94 presenting a shoulder 96 (see FIG. 12). The alignment plug 70 is sized and shaped to be threaded into one of the recesses 80.

When the alignment plug 70 is located in the corresponding recess 80, the shoulder 96 is operable to engage the surface 72 and restrict further threading movement of the alignment plug 70 into the recess 80 (see FIG. 12). It is also within the scope of the present invention to alternatively secure one or more of the alignment plugs to the chase. For instance, in some alternative embodiments, one or more alignment plugs could be press fit or adhered within an opening of the chase.

The illustrated chase assembly 34 includes four (4) alignment plugs 70 configured to be aligned with and received by the four (4) slots 48 in the die support plate 38. In particular, the heads 94 of the alignment plugs 70 are removably received by slots 48*b* to permit the die plate assembly 36 to be shifted into and out of engagement with the chase surface 72 of the chase assembly 34 (see FIG. 7*a*). When the chase assembly 34 and die plate assembly 36 are engaged, the slots 48 and alignment plugs 70 cooperatively restrict lateral sliding movement of the die plate assembly 36 along the chase surface 72 of the chase assembly 34.

However, the principles of the present invention are applicable where the chase assembly 34 includes an alternative number of alignment plugs 70. Furthermore, one or more of the alignment plugs 70 could be alternatively arranged within the recesses 80 of the chase 64. The illustrated plugs 68,70 are preferably sized so that the plugs 68,70 fit snugly within the chase 64 and are prevented from moving laterally therein (i.e., each plug 68,70 is prevented from moving transversely to the axis of the corresponding recess). In at least some applications, the plugs 68,70 could be secured alternatively in the recesses.

Similar to the magnetic connection between the assemblies 34 and 36, certain aspects of the present invention contemplate reversing the orientation of the slots 48 and plugs 70. For example, the chase assembly 34 may alternatively be provided with slots and the plate assembly 36 includes complemental plugs (or pins) received in the chase slots such that the chase alignment element comprises a slot rather than a plug. Yet further, each assembly may be provided with a combination of plugs and slots that cooperate with complemental slots and plugs of the other assembly.

As mentioned above, some of the lift bores 76*a* are preferably sized and positioned in alignment with corresponding lift slots 48*b*. The aligned bores 76*a* and slots 48*b* are also preferably aligned with pistons of the lift mechanism 26 to receive the pistons, as will be discussed (see FIGS. 8 and 9).

Although the graphic arts die assembly 22 preferably includes the illustrated chase assembly 34, an alternative chase could be used to support one or more dies (as shown in a subsequent embodiment). Other alternative chase structures are disclosed in the above-incorporated '709 patent.

For hot foil stamping and embossing/debossing operations, the chase assembly 34 is preferably heated to a temperature that ranges from about one hundred thirty degrees Fahrenheit (130° F.) to about four hundred degrees Fahrenheit (400° F.). Preferably, the chase surfaces 72,74 of the chase assembly 34 are substantially planar and parallel to one another.

The preferred arrangement of magnetic plugs 68 in the chase 64 is depicted in FIGS. 2 and 5, while the preferred arrangement of alignment plugs 70 in the chase 64 is depicted in FIGS. 5 and 7. Again, the principles of the present invention are equally applicable where the magnetic plugs 68 and/or the alignment plugs 70 are alternatively arranged within the chase 64.

Furthermore, an alternative number of magnetic plugs 68 and/or alignment plugs 70 could be secured in the chase 64. For instance, the chase assembly could have a smaller number of magnetic plugs (e.g., where the magnetic force associated with each plug is increased).

The chase and die plate assemblies 34 and 36 are preferably magnetically interconnected through the use of magnetic plugs 68 spaced along the surface 72 of the chase 64. However, as mentioned above, one or more dies could also be secured to the chase assembly 34 with conventional toggle clamps (not shown). In the usual manner, toggle clamps can be removably secured within corresponding bores 76 of the chase 64 and brought into mechanical engagement with one or more dies and/or a die support plate supporting one or more dies. Also, as noted above, threaded fasteners can be used to secure one or more dies directly to the chase (e.g., by threading fasteners into the holes **76*b***).

Again, the die plate assembly 36 is configured to be shifted into and out of engagement with the chase surface 72 of the chase assembly 34. Preferably, when the chase assembly 34 and die plate assembly 36 are engaged, the alignment slots **48*a* and alignment plugs 70 cooperatively restrict lateral sliding movement of the die plate assembly 36 along the chase surface 72 of the chase assembly 34. The magnetic plugs 68 are operable to removably hold the die plate assembly 36 in engagement with the chase assembly 34**.

Turning to FIGS. 4, 5, and 8-11, relative shifting of the die plate assembly 36 and the chase assembly 34 is preferably controlled by the lift mechanism 26. As will be discussed, pistons of the lift mechanism 26 are selectively powered by pressurized air and configured to shift the die plate assembly 36 away from the chase assembly 34 (see FIGS. 9 and 11).

When secured to one another, the chase assembly 34 and the die plate assembly 36 cooperatively provide a low profile graphic arts die assembly 22 for use in the press 20. That is, the chase assembly 34 and the die plate assembly 36 cooperatively present a maximum assembly height dimension that is compactly sized so that the combination can be suitably installed and removed from the press 20. This advantage is applicable whether the chase assembly 34 and the die plate assembly 36 are installed in the press simultaneously or sequentially.

Lift Mechanism

Turning to FIGS. 2-6, 8, and 9, the illustrated lift mechanism 26 is configured for use with each of the die assembly 22 and the counter assembly 24. In particular, the die assembly 22 and the counter assembly 24 include similar magnetic support structures and graphic arts plate assemblies configured for use with the lift mechanism 26. The lift mechanism 26 preferably includes a frame 104, pistons **106*a,b*, and clamps 108. Located generally within the frame 104, the lift mechanism 26 further includes caps 110, springs 112, cylinders 114, fluid lines 116*a,b* (see FIGS. 6, 8, and 9**).

The clamps 108 are attached to the frame 104 to selectively engage the chase 64. In the usual manner, the clamps 108 are shiftable between a released position (see FIG. 2), in which the clamps 108 permit placement of the chase assembly 34 on the frame 104 of the lift mechanism 26 and removal therefrom, and a clamped position (see FIGS. 4 and 7), in which the chase assembly 34 is secured to the frame 104 of the lift mechanism 26.

The caps 110 and cylinders 114 cooperatively present chambers 118 that slidably receive respective pistons 106 (see FIGS. 8 and 9). The chambers 118 also fluidly communicate with fluid lines **116*a* so that compressed air can be conveyed to and from the chambers 118. In the illustrated embodiment, the fluid lines 116*a* are in fluid communication with one another and with fluid line 116*b*. The fluid line 116*b* serves to supply pressurized air to the fluid lines 116*a***.

The frame 108 presents a generally planar upper surface 120 to removably receive and support the chase assembly 34. The lift mechanism 26 also includes alignment studs 122 fixed to the frame 108 and projecting away from the upper surface 120 (see FIGS. 2, 10, and 11). As discussed below, the upper surface 120 and studs 122 are configured to cooperatively position the chase assembly 34.

The lift mechanism 26 preferably includes carbon steel. However, it is within the ambit of the present invention where at least part of the lift mechanism 26 is formed of an alternative material (such as stainless steel, aluminum, synthetic resin, etc.). To the extent that some components of the lift mechanism 26 are formed of aluminum, it is preferable that the lift mechanism 26 includes a carbon steel plate that presents the upper surface 120. The lift mechanism 26 can be formed of a ferromagnetic material, a non-ferromagnetic material, or a combination thereof. It has been found that the lift mechanism 26 does not generally interfere with the magnetic connection between the chase assembly 34 and die plate assembly 36.

The pistons **106*a,b* each present a piston end 124 and an opposite lift end 126 (see FIGS. 8 and 9). The piston end 124 presents a lifting face 124*a* and a retracting face 124*b* (see FIGS. 8 and 9). For each piston 106*a*, the lift end 126 presents a generally planar end surface. For each piston 106*b*, the lift end 126 presents an endmost pin section 126*a* and a shoulder 126*b* that surrounds the endmost pin section 126*a*. In alternative embodiments, the pistons could be alternatively configured and/or positioned without departing from the scope of the present invention. For instance, the pistons 106*b*** could be devoid of endmost pin sections and shoulders.

The piston end 124 is slidably received by the chamber 118 and engaged with a side wall 130 of the cylinder 114 (see FIGS. 8 and 9). The piston 106 is operable to slide axially relative to the chamber 118 between a retracted position (see FIG. 8) and an extended position (see FIG. 9). Although the pistons comprise preferred lift elements, it is also within the ambit of the present invention where the lift mechanism includes one or more alternative lift elements. For instance, the lift mechanism could include one or more pivotal levers that swing between retracted and extended positions.

In the retracted position, each piston 106 is preferably partly received within the corresponding chamber 118. Although, for some aspects of the present invention, the entire piston 106 could be received by the chamber 118 in the retracted position.

In the extended position, each piston 106 extends into and out of the chamber 118 so that the lift ends 126 are spaced from the chambers 118. In the illustrated embodiment, all of the pistons 106 project from the same upper surface 120 when extended. However, the principles of the present invention are applicable where some of the pistons 106 project from the surface 120 when extended, and other pistons 106 project from an opposite lower surface of the frame (i.e., in an opposite direction from the frame) when extended. For such an alternative lift mechanism, either side of the lift mechanism could be used to shift die plate assembly 36 and the chase assembly 34 into and out of engagement with one another.

The illustrated spring 112 is preferably used to retract the corresponding piston 106. Preferably, the spring 112 is mounted on the piston 106 and is located in the annular space within the chamber 118. The spring 112 preferably urges the piston 106 toward the retracted position. In particular, when the piston 106 is in the extended position, the piston end 124 and the cap 110 cooperatively compress the spring 112 (see FIG. 9). The compressed spring 112 applies a spring force to the retracting face 124*b* and urges the piston 106 to retract out of the extended position (i.e., to move toward the retracted position).

It will also be appreciated that an alternative mechanism could be used to retract the piston 106. For instance, in the illustrated embodiment, the retracting face 124*b* is generally exposed to ambient air pressure. However, the lift mechanism 26 could be configured to supply pressurized air (or another pressurized fluid) to the retracting face 124*b*.

For the illustrated lift mechanism 26, the piston 106 is selectively extended through the use of pressurized air provided from a compressed air source (not shown). As pressurized air is supplied to the fluid lines 116 and the lifting face 124*a*, the pressurized air preferably produces a lifting force that overcomes the friction associated with sliding contact between the piston 106 and the cylinder 114 and shifts the piston 106 toward the extended position. Furthermore, as the piston 106 is moved and cooperates with the cap 110 to compress the spring 112, the lifting force preferably also overcomes the spring force and shifts the piston 106 toward the extended position.

Although pressurized air is preferably used to move the pistons 106 to the extended position, the lift mechanism 26 could use another pressurized fluid, such as a hydraulic fluid, to move the pistons 106.

Using the Lift Mechanism with the Graphic Arts Die Assembly

As mentioned above, some of the lift bores 76*a* are preferably positioned in alignment with corresponding lift slots 48*b* (see FIGS. 8 and 9). The aligned lift bores 76*a* and lift slots 48*b* are also aligned with corresponding pistons 106*b* to receive the pin sections 126*a* of the pistons 106*b* (see FIG. 9). The pistons 106*a* are aligned with other corresponding lift bores 76*a*. Consequently, pistons 106*a,b* can be extended through the chase assembly 34 to engage the die plate assembly 36.

Again, the lift mechanism 26 includes alignment studs 122 secured to the surface 120. The studs 122 are configured to engage the slots 66*a* presented by the inserts 66 (see FIGS. 3, 10, and 11). In this manner, the studs 122 and slots 66*a* cooperatively align the chase 64 relative to the lift mechanism 26.

Similar to the alignment features used to align the assemblies 34 and 36 with each other, the orientation of the slots 66*a* and studs 122 could be reversed. For example, the lift mechanism 26 may alternatively be provided with slots and the chase assembly 34 could include complemental studs received in the lift mechanism slots (such that the alignment element of the lift mechanism comprises a slot rather than a stud). Yet further, the lift mechanism and the chase assembly may each be provided with a combination of studs and slots that cooperate with complemental slots and studs of the other one of the lift mechanism and the chase assembly.

In the illustrated embodiment, when using the lift mechanism 26 to disengage the die plate assembly 36 from the chase assembly 34, the chase assembly 34 preferably rests on the lift mechanism 26. The chase assembly 34 is preferably removably secured to the frame 104 of the lift mechanism 26 by clamps 108. However, it will be appreciated that the lift mechanism 26 and chase assembly 34 could be alternatively attached to one another. For some aspects of the present invention, an alternative fastenerless system may be provided for securing the chase assembly 34 to the lift mechanism 26.

With the chase assembly 34 resting on the lift mechanism 26, the entirety of the chase surface 74 is depicted as being in contact with the lift mechanism 26. Nevertheless, it will be understood that only part of the chase surface 74 may be in contact with the lift mechanism 26 when the chase assembly 34 is positioned on the lift mechanism 26. For instance, this may occur because the chase surface 74 and/or the upper surface 120 do not have a perfectly planar shape or because the chase surface 74 is larger than the upper surface 120. However, even where the upper surface 120 and the chase surface 74 are in partial contact with each other, the lift mechanism 26 is still preferably operable to control relative shifting of the die plate assembly 36 and the chase assembly 34 (while the assemblies 34 and 36 are associated with the lift mechanism 26).

Again, the lift mechanism 26 is used with the die assembly 22 to shift the die plate assembly 36 out of engagement with the chase assembly 34. The lift mechanism 26 is used by initially resting the chase assembly 34 and the die plate assembly 36 on the lift mechanism 26, with the pistons 106 being retracted (see FIGS. 8 and 10). As necessary, the chase assembly 34 and die plate assembly 36 are selectively moved on the lift mechanism 26 to align the pistons 106 with corresponding lift bores 76*a* and slots 48*a*. It is also permissible to move the lift mechanism 26 to align the pistons 106 with bores 76*a* and slots 48*a*, although movement of the chase is preferred. Pressurized air is then supplied to the lift mechanism 26 to extend the pistons 106 into engagement with the die plate assembly 36.

Preferably, pressurized air is supplied so that the pistons 106 are extended to move the die plate assembly 36 out of engagement with the chase assembly 34 (see FIGS. 9 and 11). That is, the force applied to the die plate assembly 36 by the pistons 106 preferably overcomes the magnetic force (applied by the magnetic plugs 68) holding the die plate assembly 36 and chase assembly 34 in engagement. With the pistons 106 extended, the die plate assembly 36 is sufficiently spaced apart from the magnetic plugs 68 so that the user can freely move the die plate assembly 36 relative to (e.g., entirely away from) the chase assembly 34.

Although the lift mechanism 26 is used to disengage the chase assembly 34 and the die plate assembly 36, the lift mechanism 26 is also configured to facilitate alignment and engagement of the chase assembly 34 and the die plate assembly 36. This process is initiated by supplying pressurized air to the lift mechanism 26 to hold the pistons 106 in the extended position (see FIGS. 9 and 11). With the pistons 106 extended, the die plate assembly 36 is positioned on the pistons 106 and is spaced apart from the magnetic plugs 68 to an extent that the user can freely slide the die plate assembly 36 laterally relative to the chase assembly 34. Thus, the extended pistons 106 facilitate lateral movement of the die plate assembly 36 for aligning the die plate assembly 36 and the chase assembly 34.

With the heads 94 of the plugs 70 being in alignment with corresponding slots 48*a*, the pressure of pressurized air within the lift mechanism 26 can be reduced to permit the pistons 106 to retract (due to the spring force applied to the piston 106 and the force of gravity). As a result, the die plate assembly 36 moves into engagement with the chase assembly 34, and the magnetic plugs 68 apply a magnetic force that holds the chase assembly 34 and die plate assembly 36 in engagement with one another.

Graphic Arts Counter Assembly

Turning to FIGS. 13-20, the graphic arts counter assembly 24 is configured to provide foil stamping, embossing, debossing, or any combination thereof. The graphic arts counter assembly 24 preferably includes a platen assembly 134 and a counter plate assembly 136. The counter plate assembly 136 comprises another preferred embodiment of a graphic arts plate assembly that can be supported by a magnetic support structure (with the support structure preferably being in the form of the platen assembly 134).

The counter plate assembly 136 preferably includes a counter support plate 138 and graphic arts counters 140 mounted to the support plate 138 by adhesive tape 141 (see FIG. 15). The counter support plate 138 presents a platen-engaging surface 142, a counter-receiving surface 144, a perimeter edge 146, alignment slots 148*a*, and lift slots 148*b* (see FIGS. 15, 17, 17*a*, 18, and 20). The slots 148*a* and 148*b* are preferably spaced interiorly of the edge 146. The features of the counter support plate 138, including the slots 148*a,b*, are similar to corresponding features of the die support plate 38.

The counter support plate 138 is configured to be removably attached to the counters 140 by the tape 141 and to support the counters 140 on the surface 144. However, it will be appreciated that the counters 140 could be alternatively secured to the counter support plate 138 without departing from the scope of the present invention. For instance, as one of skill in the art will appreciate, one or more counters could be mounted to make-ready, with the make-ready being mounted on a support plate.

Turning to FIGS. 15 and 19, each graphic arts counter 140 preferably presents a counter surface 150. In the usual manner, each counter 140 is associated and aligned with a corresponding die 40 so that the counter surface 150 opposes a respective engraved surface 58. The engraved surface of the die and the opposed counter surface are configured to cooperatively provide embossing, debossing, foil stamping, die-cutting, or any combination thereof.

The counter surface 150 presents counter image indicia (not shown) that is configured to be positioned in registration with the image indicia 60 associated with one of the dies 40. It is within the ambit of the present invention where the counter surface includes various indicia (e.g., to cooperate with a respective die for various graphic arts processes). However, the counter surface could also be devoid of image indicia (e.g., where the entire surface is planar). The image indicia of the counters is preferably formed by molding, but could be alternatively formed by engraving and/or machining. Again, it will be appreciated that the counter, and various alternative embodiments thereof, can be provided for embossing, debossing, foil stamping, die-cutting, or any combination thereof.

The platen assembly 134 is another preferred embodiment of a magnetic support structure for supporting a graphic arts plate assembly. In the illustrated embodiment, the platen assembly 134 preferably removably supports the counter plate assembly 136. As will be explained in detail, the counter plate assembly 136 is preferably secured to the platen assembly 134 magnetically.

Preferably, the platen assembly 134 includes a platen 154, a backing plate 156, magnetic plugs 158, and alignment plugs 160 (see FIGS. 13, 19, and 20). These features, including the magnetic plugs 158 and alignment plugs 160, are similar to corresponding features of the chase assembly 34.

The illustrated platen 154 is unitary and presents opposite platen surfaces 162,164 (see FIG. 18-20). The platen 154 also preferably presents an array of lift bores 166*a* and threaded holes 166*b* (see FIGS. 13, 14, and 18). The backing plate 156 is positioned in engagement with the platen surface 164 to adjust the total thickness of the platen assembly 134. However, for some aspects of the present invention, the platen assembly could be devoid of the backing plate. Holes 166*b* are preferably provided for mounting the backing plate 156 to the platen. The holes 166*b* preferably comprise threaded through holes that extend continuously from one platen surface 162 to the other platen surface 164, but could be formed as blind holes that extend only partly through the platen from the platen surface 164.

The platen 154 also presents magnet recesses 168 and alignment recesses 170 (see FIG. 20) similar to magnet recesses 78 and alignment recesses 80, respectively. The magnet recesses 168 are defined by corresponding walls with threaded sections 168*a* and annular shoulders 168*b* (see FIG. 20).

However, the magnet recesses could be alternatively configured and/or positioned without departing from the scope of the present invention. For instance, an alternative magnet recess could comprise a through hole (extending continuously between the surfaces 162,164).

The alignment recesses 170 are defined by corresponding walls with threaded sections 170*a* (see FIG. 20). Each illustrated alignment recess 170 preferably comprises a through hole that extends completely through the platen 154 (to intersect both surfaces 162,164). However, the alignment recess could be alternatively shaped and/or positioned. In one alternative embodiment, the alignment recess could have a form identical or similar to the magnet recess 168.

The platen 154 is preferably formed of aluminum, but could be formed of an alternative material (such as stainless steel, carbon steel, synthetic resin, etc.) without departing from the principles of the present invention. It will also be understood that the platen 154 can be formed of a ferromagnetic material or a non-ferromagnetic material. If a ferromagnetic material is used, the platen 154 is configured and designed to avoid interference with the use of the platen 154.

Turning to FIGS. 17*a* and 20, the magnetic plugs 158 are operable to removably hold the counter plate assembly 136 in engagement with the platen assembly 134. Each magnetic plug 158 preferably includes a body 174 and a permanent magnet 176 fixed to the body 174 (see FIG. 20). The magnet 176 presents an exposed magnet surface 176*a*.

The illustrated body 84 presents peripheral threads 178 and a flange 180 (see FIG. 20). The body 84 also presents an upper surface 174*a*, a socket 174*b* to receive the magnet 176, and holes 174*c* (see FIGS. 17*a* and 20) to be engaged by a wrench (not shown). The magnetic plug 158 is sized and shaped to be threaded into and out of a corresponding recess 168. It is also within the ambit of the present invention to alternatively secure one or more of the magnetic plugs to the platen. For instance, in some alternative embodiments, one or more magnetic plugs could be press fit or adhered within an opening of the platen.

Although the illustrated embodiment provides the platen 154 with magnets 176, certain aspects of the present invention contemplates alternative means for removably and magnetically interconnecting the platen assembly 134 and the counter plate assembly 136. For example, in some alternative embodiments the die plate assembly may be provided with magnets and the platen assembly may be formed at least in part of ferromagnetic material. Certain aspects of the present invention may also comprise both assemblies having magnets. With this alternative, the magnet of each assembly may be associated with a ferromagnetic portion or insert of the other assembly.

Referring again to FIGS. 17*a* and 20, the alignment plugs 160 are operable to locate the counter plate assembly 136 on the chase assembly 134 and restrict lateral movement therebetween. Each alignment plug 160 presents a threaded body 182 and a head 184, with the head 184 presenting a shoulder 186 (see FIG. 20). The alignment plug 160 is sized and shaped to be threaded into one of the recesses 170.

When the alignment plug 160 is located in the corresponding recess 170, the shoulder 186 is operable to engage the surface 162 and restrict further threading movement of the alignment plug 160 into the recess 170 (see FIG. 20). One or more of the alignment plugs could be alternatively secured to the platen without departing from the scope of the present invention. For instance, in some alternative embodiments, one or more alignment plugs could be press fit or adhered within an opening of the platen.

The illustrated platen assembly 134 includes four (4) alignment plugs 160 configured to be aligned with and received by the four (4) alignment slots 148*a* in the counter support plate 138. However, the principles of the present invention are applicable where the platen assembly 134 includes an alternative number of alignment plugs 160. Furthermore, one or more of the alignment plugs 160 could be alternatively arranged within the recesses.

For some aspects of the present invention, the orientation of the slots 148*a* and plugs 160 may be reversed. For example, the platen assembly 134 may alternatively be provided with slots and the counter plate assembly 136 includes complemental alignment plugs (or pins) received in the platen slots such that the platen alignment element comprises a slot rather than a plug. Yet further, the platen assembly and the counter plate assembly may each be provided with a combination of plugs and slots that cooperate with complemental slots and plugs of the other assembly.

Using the Lift Manifold with the Graphic Arts Counter Assembly

As noted above, the lift mechanism 26 is preferably configured for use with both the die assembly 22 and the counter assembly 24. The die assembly 22 and the counter assembly 24 include similar magnetic support structures and graphic arts plate assemblies that can be selectively separated from one another by the lift mechanism 26. Consequently, the use of the lift mechanism 26 to control relative shifting of the platen assembly 134 and the counter plate assembly 136 is similar to how the lift mechanism 26 is used with the chase assembly 34 and die plate assembly 36, although different processes could be employed.

The lift bores 166*a* and lift slots 148*b* are preferably aligned with corresponding pistons 106*b* to receive the pin sections 126*a* of the pistons 106*b* when the pistons 106*b* are extended (see FIG. 18). The pistons 106*a* are aligned with other corresponding lift bores 166*a*. Consequently, pistons 106*a,b* can be extended through the platen assembly 134 to engage the counter plate assembly 136. As noted above, the pistons 106*b* could also be devoid of pin sections.

The alignment studs 122 of the lift mechanism 26 are configured to engage slots 188 presented by the platen 154 (see FIG. 19). In this manner, the studs 122 and slots 188 cooperatively align the platen 154 relative to the lift mechanism 26. In the illustrated embodiment, when using the lift mechanism 26 to disengage the platen assembly 134 from the counter plate assembly 136, the platen assembly 134 is preferably removably secured to the frame 104 of the lift mechanism 26 by clamps 108.

Again, the lift mechanism 26 is used with the counter assembly 24 to shift the counter plate assembly 136 out of engagement with the platen assembly 134. The lift mechanism 26 is used by initially resting the platen assembly 134 and the counter plate assembly 136 on the lift mechanism 26, with the pistons 106 being retracted. As necessary, the platen assembly 134 and the counter plate assembly 136 are selectively moved on the lift mechanism 26 to align the pistons 106 with corresponding lift bores 166*a* and lift slots 148*b*. It is also permissible to move the lift mechanism 26 to align the pistons 106 with bores 166*a* and slots 148*b*, although movement of the chase is preferred. Pressurized air is then supplied to the lift mechanism 26 to extend the pistons 106 into engagement with the counter plate assembly 136.

Preferably, pressurized air is supplied so that the pistons 106 are extended to move the counter plate assembly 136 out of engagement with the platen assembly 134. With the pistons 106 extended, the counter plate assembly 136 is sufficiently spaced apart from the magnetic plugs 158 so that the user can freely move the counter plate assembly 136 relative to (e.g., entire away from) the platen assembly 134.

The lift mechanism 26 is also configured to facilitate alignment and engagement of the platen assembly 134 and the counter plate assembly 136. This process is initiated by supplying pressurized air to the lift mechanism 26 to hold the pistons 106 in the extended position. With the pistons 106 extended, the counter plate assembly 136 is positioned on the pistons 106 and is spaced apart from the magnetic plugs 158 to an extent that the user can freely slide the counter plate assembly 136 laterally relative to the platen assembly 134.

With the heads 184 of the plugs 160 being in alignment with corresponding slots 148*a*, the pressure of pressurized air within the lift mechanism 26 can be reduced to permit the pistons 106 to retract (due to the spring force applied to the piston 106 and the force of gravity). As a result, the counter plate assembly 136 moves into engagement with the platen assembly 134, and the magnetic plugs 158 apply a magnetic force that holds the platen assembly 134 and counter plate assembly 136 in engagement with one another.

Thus, the die assembly 22 and counter assembly 24 are both configured for removable magnetic engagement. In particular, the die plate assembly 36 is preferably secured to the chase assembly 34 magnetically, while the counter plate assembly 136 is preferably secured to the platen assembly 134 magnetically. However, for some aspects of the present invention, only one of the die assembly 22 and counter assembly 24 could have the illustrated magnetic connection. For instance, one of the chase assembly and the platen assembly may be used to at least partly non-magnetically support a die plate or a counter plate, respectively (e.g., using conventional toggle clamps (not shown)).

Again, the lift mechanism 26 can be selectively used with one of the die assembly 22 and the counter assembly 24 at a particular time. However, the lift mechanism 26 could be configured for use with both assemblies 22,24 at the same time. For alternative aspects of the present invention, the assemblies 22,24 could each have a dedicated lift mechanism. In such an alternative situation, the lift mechanisms could have different configurations such that the lift mechanisms cannot be used with both assemblies 22,24.

Alternative Embodiment

Turning to FIGS. 21-32, a second preferred embodiment of the present invention is depicted. For the sake of brevity, the remaining description will focus primarily on the differences of this alternative embodiment from the preferred embodiment described above.

An alternative flat bed press 220 (see FIGS. 30 and 31) is used to perform hot foil stamping, embossing, or debossing (or any combination thereof) of a substrate. As will be described in greater detail, a graphic arts die assembly 222 for the press 220 is configured to be setup quickly and efficiently for use as part of the press 220. During setup, the construction of the graphic arts die assembly 222 enables fine adjustment of die position along a lateral direction. As will be discussed, a manifold 224 and the press 220 cooperatively provide a press system 226 to facilitate the die setup process (see FIGS. 30 and 31). The press 220 preferably includes the graphic arts die assembly 222, a graphic arts counter structure 228, and a reciprocating support structure (similar to support structure 30).

The illustrated press 220 can comprise either a sheet fed press or a web press without departing from the scope of the present invention. The graphic arts counter structure 228 is mounted to the support structure for reciprocating movement relative to the graphic arts die assembly 222. As in the previous embodiment, the structures 222 and 228 can be variously configured to provide foil stamping, embossing, debossing, or any combination thereof.

The illustrated press 220 further includes a pair of support arms **232*a,b* configured to support the die assembly 222 (see FIGS. 30 and 31). As will be explained, the die assembly 222 can be temporarily supported by the arms 232*a,b* prior to installation on the press 220 or after removal from the press 220**.

Turning to FIGS. 21-29, the graphic arts die assembly 222 is configured to be brought into engagement with the graphic arts counter structure 228 to provide foil stamping, embossing, debossing, or any combination thereof. The graphic arts die assembly 22 preferably includes a chase assembly 234 and a die plate assembly 236. The die plate assembly 236 comprises another preferred embodiment of a graphic arts plate assembly supported by a magnetic support structure (with the support structure preferably being in the form of chase assembly 234).

The die plate assembly 236 preferably includes a die support plate 238 and a graphic arts die 240. The die support plate 238 presents a chase-engaging surface 242, a die-receiving surface 244, a perimeter edge 246, and slots 248 spaced interiorly of the edge 246 (see FIGS. 21 and 22). The die support plate 238 is configured to be removably attached to the die 240 and to support the die 240 on the surface 244.

The die support plate 238 is preferably ferromagnetic to permit magnetic engagement between the die support plate 238 and the chase assembly 234. More preferably, the die support plate 238 is formed entirely of a ferromagnetic material, such as carbon steel. In alternative embodiments, the die support plate 238 could include a non-ferromagnetic material and at least some ferromagnetic material for magnetic engagement with the chase assembly 234. Although carbon steel is a preferred material for the die support plate, the die support plate could alternatively or additionally include one or more alternative materials (such as stainless steel or aluminum) without departing from the principles of the present invention.

Preferably, the die plate assembly 236 also includes a plurality of threaded studs 250 welded to the die support plate 238 and projecting from the surface 244. The die plate assembly 236 further includes a plurality of threaded nuts 252 removably threaded onto the studs 250 (see FIGS. 23 and 24). The studs 250 and nuts 252 serve to secure the graphic arts die 240 onto the die support plate 238. Consistent with the principles of the present invention, an alternative die support plate could also be provided.

Turning to FIGS. 23-26, each graphic arts die 240 preferably comprises an engraved graphic arts die, although the principles of the present invention are also applicable where the graphic arts die 240 comprises a die-cutting die.

Similar to die 40, the graphic arts die 240 preferably presents a machined edge 254, counterbored holes 256, and an engraved surface 258 (see FIG. 24). The engraved surface 258 is preferably formed by engraving the graphic arts die 240, with the engraved surface 258 defining an image indicia 260. The graphic arts die 240 also presents a generally planar background surface 262 that surrounds the engraved surface 258.

The counterbored holes 256 are configured to receive the studs 250, with the nuts 252 being received by the counterbore so that the nuts 252 do not project out of the holes 256 and beyond the background surface 262. The holes 256 are preferably located about and spaced from the indicia 260.

Referring again to FIGS. 21-29, the chase assembly 234 is another preferred embodiment of a magnetic support structure for supporting a graphic arts plate assembly. In the illustrated embodiment, the chase assembly 234 preferably removably supports the die plate assembly 236. As will be explained in detail, the die plate assembly 236 is preferably secured to the chase assembly 234 magnetically. However, for some aspects of the present invention, the chase assembly may also be used to at least partly non-magnetically support a die plate (e.g., using conventional toggle clamps (not shown)). Preferably, the chase assembly 234 includes a chase 264, a backing plate 266, magnetic plugs 268, and alignment plugs 270 (see FIGS. 21, 22, and 27-29).

The illustrated chase 264 comprises a conventional honeycomb chase structure to adjustably support graphic arts die 240. The chase 264 is unitary and presents opposite chase surfaces 272,274 and an array of uniformly spaced through bores 276 (see FIGS. 25-29). The bores 276 intersect the surfaces 272,274 to define chase openings 278,280 (see FIGS. 25-27).

Each bore 276 comprises a counterbored hole that presents a shoulder 282 (see FIGS. 25-27). As will be discussed, some of the bores 276 removably receive plugs 268,270. Furthermore, other bores 276 are sized and positioned to be aligned with corresponding openings in the backing plate 266.

For some aspects of the present invention, the chase 264 could include alternative features to mount one or more dies thereon. For instance, one or more dies could be attached directly to the chase with threaded fasteners (e.g., as is customary with narrow web chases). In such an alternative configuration, the chase could have one or more threaded openings that receive threaded fasteners for securing the dies directly onto the chase.

Turning to FIGS. 27 and 29, the magnetic plugs 268 are operable to magnetically and removably hold the die plate assembly 236 in engagement with the chase assembly 234. Each magnetic plug 268 preferably includes a sleeve 284 and a permanent magnet 286 fixed to the sleeve 284 (see FIG. 27). The illustrated sleeve 284 presents a peripheral side surface 288 with a shoulder 290 (see FIG. 27). The magnetic plug 268 is sized and shaped to be inserted through one of the chase openings 280 and slidably received within a corresponding bore 276.

When the magnetic plug 268 is located in the bore 276, the shoulders 282,290 are operable to engage one another and restrict movement of the magnetic plug 268 toward the chase opening 278.

Preferably, the permanent magnets 286 are formed of a high-temperature samarium-cobalt material. The sleeve 284 preferably comprises a carbon steel material, but could include an alternative material (such as stainless steel, aluminum, synthetic resin, etc.) without departing from the scope of the present invention. Each magnet 286 is preferably adhered to the sleeve 284 with an adhesive material (not shown), although the magnet 286 and sleeve 284 could be alternatively fixed to one another.

Turning to FIGS. 28 and 29, the alignment plugs 270 are operable to locate the die plate assembly 236 on the chase assembly 234 and restrict lateral movement therebetween. Each alignment plug 270 presents a peripheral side surface 292 with a shoulder 294 and also includes an axial alignment pin section 296 (see FIG. 28). The alignment plug 270 is sized and shaped to be inserted through one of the chase openings 280 and slidably received within a corresponding bore 276.

When the alignment plug 270 is located in the corresponding bore 276, the shoulders 282,294 are operable to engage one another and restrict movement of the alignment plug 270 toward the chase opening 278 (see FIG. 28).

The illustrated chase assembly 234 includes four (4) alignment plugs 70 configured to be aligned with and received by the four (4) slots 248 in the die support plate 238. In particular, the pin sections 296 of the alignment plugs 270 are removably received by slots 248 to permit the die plate assembly 236 to be shifted into and out of engagement with the chase surface 272 of the chase assembly 234. When the chase assembly 234 and die plate assembly 236 are engaged, the slots 248 and alignment plugs 270 cooperatively restrict lateral sliding movement of the die plate assembly 236 along the chase surface 272 of the chase assembly 234.

The illustrated plugs 268,270 present a plug diameter that is preferably sized relative to the diameter of the bores 276 so that the plugs 268,270 fit snugly within the bores 276 and are prevented from moving laterally therein (i.e., each plug 268,270 is prevented from moving transversely to the axis of the corresponding bore). In at least some applications, the plugs 268,270 could be secured in the bores 276 in a press fit (or another similar fit).

Turning to FIGS. 21, 22, and 25-28, the backing plate 266 preferably secures the plugs 268,270 within the bores 276. The illustrated backing plate 266 is unitary and presents opposite plate surfaces 298,300 and plate openings 302. Similar to chase 264, the backing plate 266 preferably includes carbon steel, but could be formed of an alternative material (such as stainless steel, aluminum, synthetic resin, etc.) without departing from the scope of the present invention. Also, the backing plate 66 can be formed of a ferromagnetic material or a non-ferromagnetic material. If a ferromagnetic material is used, the chase 264 and backing plate 166 are configured and designed to avoid interference with the use of the chase assembly 234.

The backing plate 266 is preferably removably secured to the chase surface 272 with screws 304, although the backing plate 266 could be alternatively attached to the chase 264 (see FIGS. 21 and 22). It will also be understood that the backing plate 266 could be alternatively constructed (e.g., to hold the plugs 268,270 within bores 276). However, for some aspects of the present invention, the chase assembly could be devoid of a backing plate.

Preferably, the plugs 268,270 are cooperatively captured by the backing plate 266 and the chase 264 to restrict the plugs from falling out of the bores 276 (see FIG. 27). In the illustrated embodiment, plugs 268,270 are loosely mounted so that a slight amount of plug movement within the bore 276 is permitted (preferably only in an axial direction and only enough in a radial direction to permit insertion of plugs within bores). However, it is within the scope of the present invention where the plugs 268,270 are alternatively supported as part of the chase assembly 234. For instance, the plugs 268,270 could be fixed to the chase 264 (e.g., where the plugs 268,270 are adhered or welded to the chase 264). Similarly, the plugs 268,270 could be fixed to the backing plate 266 (e.g., where plugs 268,270 are adhered or welded to the plate surface 298 of backing plate 266).

Although the illustrated embodiment provides the chase 264 with magnets 286, certain aspects of the present invention contemplate alternative means for removably and magnetically interconnecting the chase assembly 234 and the die plate assembly 236. For example, in some alternative embodiments the die plate assembly may be provided with magnets and the chase assembly may be formed at least in part of ferromagnetic material. Certain aspects of the present invention may also comprise both assemblies having magnets. With this alternative, the magnet of each assembly may be associated with a ferromagnetic portion or insert of the other assembly.

Also, for some aspects of the present invention, the orientation of the slots 248 and alignment plugs 270 may be reversed. For example, the chase assembly 234 may alternatively be provided with slots and the die plate assembly 236 includes complemental alignment plugs (or pins) received in the chase slots such that the chase alignment element comprises a slot rather than a plug. Yet further, the chase assembly and the die plate assembly may each be provided with a combination of plugs and slots that cooperate with complemental slots and plugs of the other assembly.

As mentioned above, some of the bores 276 are preferably sized and positioned in alignment with corresponding plate openings 302 in the backing plate 266. The aligned bores 276 and openings 302 are also preferably aligned with lift pins of the manifold 224 to receive the lift pins, as will be discussed (see FIG. 26).

The chase assembly 234 and the die plate assembly 236 are preferably magnetically interconnected through the use of magnetic plugs 268 spaced along the surface of the chase 264. However, as mentioned above, one or more dies could also be secured to the chase assembly 234 with conventional toggle clamps (not shown). The illustrated chase 264 is particularly configured so that toggle clamps can be removably secured within corresponding bores 276 of the chase 264 and brought into mechanical engagement with one or more dies and/or a die support plate supporting one or more dies.

Again, the die plate assembly 236 is configured to be shifted into and out of engagement with the chase surface 272 of the chase assembly 234. Preferably, when the chase assembly 234 and die plate assembly 236 are engaged, the slots 248 and alignment plugs 270 cooperatively restrict lateral sliding movement of the die plate assembly 236 along the chase surface 272 of the chase assembly 234. The magnetic plugs 268 are operable to removably hold the die plate assembly 236 in engagement with the chase assembly 234.

Turning to FIGS. 21-23 and 26-28, relative shifting of the die plate assembly 236 and the chase assembly 234 is preferably controlled by the manifold 224 (when the assemblies 234 and 236 are associated with the manifold 224). As will be discussed, lift pins 306 of the manifold 224 are selectively powered by pressurized air and configured to shift the die plate assembly 236 away from the chase assembly 34 (see FIGS. 25 and 26).

When secured to one another, the chase assembly 234 and the die plate assembly 236 cooperatively provide a low profile graphic arts die assembly 222 for use in the press 220. That is, the chase assembly 234 and the die plate assembly 236 cooperatively present a maximum assembly height dimension that is compactly sized so that the combination can be suitably installed and removed from the press 220. This advantage is applicable whether the chase assembly 234 and the die plate assembly 236 are installed in the press simultaneously or sequentially.

The illustrated manifold 224 comprises an alternative lift mechanism and preferably includes a body 308, caps 310, springs 312, and the lift pins 306 (see FIGS. 25 and 26). The body 308 is unitary and presents opposite manifold surfaces 314,316. The body also presents an array of sockets 318 that intersect the manifold surface 314 (see FIGS. 25 and 26). Yet further, the body 308 presents lateral bores 320 that fluidly communicate with the sockets 318 to convey compressed air to the sockets 318. The bores 320 intersect sides of the body 308 to present fluid ports 322 (see FIG. 23).

Each socket 318 preferably receives one of the caps 310 and one of the lift pins 306. The illustrated caps 310 are threaded into engagement with the body 308.

The lift pin 306 presents a piston end 324 and an opposite lift end 126 (see FIGS. 25 and 26). The piston end 324 presents a lifting face 324*a* and a retracting face 324*b* (see FIGS. 25 and 26).

The caps 310 define chambers 328 to receive the lift pins 306 and springs 312. The piston end 324 presents an annular groove 329. The piston end 324 is slidably received by the chamber 328 and engaged with a side wall 330 of the cap 110 (see FIGS. 25 and 26). The lift pin 306 is operable to slide axially relative to the socket 318 between a retracted position (see FIG. 25) and an extended position (see FIG. 26).

In the retracted position, each lift pin 306 is preferably received entirely within the corresponding socket 318 of body 308. Although, for some aspects of the present invention, a portion of the lift pin 306 could project out of the socket 318 in the retracted position.

In the extended position, each lift pin 306 extends into and out of the socket 318 so that the lift ends 326 are spaced from the sockets 318.

The illustrated spring 312 is preferably used to retract the corresponding pin 306. Preferably, the spring 312 is mounted on the lift pin 306 and is located in the annular space between the cap 310 and the piston end 324. The spring 312 preferably urges the lift pin 306 toward the retracted position.

For the illustrated manifold 224, the lift pin 306 is selectively extended through the use of pressurized air provided from a compressed air source (not shown). As pressurized air is supplied to the bores 320 and the lifting face 324*a*, the pressurized air preferably produces a lifting force that overcomes the friction associated with sliding contact between the lift pin 306 and the cap 310 and shifts the lift pin 306 toward the extended position. Furthermore, as the lift pin 306 is moved and cooperates with the cap 310 to compress the spring 312, the lifting force preferably also overcomes the spring force and shifts the lift pin 306 toward the extended position.

As mentioned above, some of the bores 276 are preferably positioned in alignment with corresponding plate openings 302 in the backing plate 266. The aligned bores 276 and openings 302 are also preferably aligned with lift pins 306 of the manifold 224 to receive the lift pins 306 (see FIG. 26). Consequently, the lift pins 306 can be extended through the chase assembly 234 to engage the die plate assembly 236.

In the illustrated embodiment, when using the manifold 224 to disengage the die plate assembly 236 from the chase assembly 234, the chase assembly 234 preferably rests on the manifold 224 and is held in place primarily by gravity. With the chase assembly 234 resting on the manifold 224, the entirety of the plate surface 300 is depicted as being in contact with the manifold 24.

Again, the manifold 224 is used with the die assembly 222 to shift the die plate assembly 236 out of engagement with the chase assembly 234. The manifold 224 is used by initially resting the chase assembly 234 and the die plate assembly 236 on the manifold 224, with the lift pins 306 being retracted (see FIG. 25). As necessary, the chase assembly 234 and die plate assembly 236 are selectively moved on the manifold 224 to align the lift pins 306 with corresponding bores 276 and openings 302.

Preferably, pressurized air is supplied so that the lift pins 306 are extended to move the die plate assembly 236 out of engagement with the chase assembly 234. With the lift pins 306 extended, the die plate assembly 236 is sufficiently spaced apart from the magnetic plugs 68 so that the user can freely move the die plate assembly 236 away from the chase assembly 234.

As with the first embodiment, the manifold 224 is also configured to facilitate alignment and engagement of the chase assembly 234 and the die plate assembly 236. This process is initiated by supplying pressurized air to the manifold 224 to hold the lift pins 306 in the extended position (see FIG. 26). With the lift pins 306 extended, the die plate assembly 236 is positioned on the lift pins 306 and is spaced apart from the magnetic plugs 268 to an extent that the user can freely slide the die plate assembly 236 laterally relative to the chase assembly 234.

With the alignment pin sections 296 being in alignment with corresponding slots 248, the pressure of pressurized air within the manifold 224 can be reduced to permit the lift pins 306 to retract (due to the spring force applied to the lift pin 306 and the force of gravity). As a result, the die plate assembly 236 moves into engagement with the chase assembly 234, and the magnetic plugs 268 apply a magnetic force that holds the chase assembly 234 and die plate assembly 236 in engagement with one another.

Similar to the first embodiment, various features of the chase assembly 236 (including the magnetic plugs and the alignment plugs) could be incorporated into the counter structure. For instance, a platen of the counter structure could be constructed to include a platen body similar to the chase. Also, such an alternative platen could be configured to include magnetic plugs and alignment plugs similar to those of the chase assembly 236.

Turning to FIGS. 30 and 31, the press 220 further includes a press housing 332 that encloses the die assembly 222 and counter structure 228 during press operation. The press housing 332 presents a press opening 334 (see FIG. 31) that provides user access to the die assembly 222 and counter structure 228 within the press housing 332.

In one preferred embodiment as shown in FIGS. 30 and 31, the die assembly 222 and manifold 224 can be temporarily supported by support arms 232*a*,232*b*. Each support arm 232*a*,232*b* preferably includes a rigid arm structure that is cantilevered relative to the press housing 332. In the depicted embodiment, the support arms 232*a*,232*b* extend through the press opening 334 and project laterally outboard from the press opening 334. The illustrated support arms 232*a,b* are spaced apart from each other and extend generally parallel to one another in a lateral direction.

It is within the ambit of the present invention where the press 220 includes support arms that are alternatively constructed and/or positioned relative to the press housing 332. For example, alternative support arms could be located above, below, or to the side of the location for support arms 232*a*,232*b*. It will also be understood that the press 220 could include a structure other than cantilevered arms to temporarily support the die assembly 222 and manifold 224. As will be discussed, the press system 226 also includes a support structure that receives the die assembly 222 and manifold 224 and is entirely detached from the press 220.

The depicted manifold 224 is swingably mounted on the support arm 232*a* at a pivot 336 and removably secured to the other support arm 232*b* in a supporting position (see FIG. 31). In the supporting position, the die assembly 222 is temporarily supported by the manifold 224 and the arms 232*a,b* adjacent to the press opening 334 to allow convenient transfer of the die assembly 222 into and out of the press 220 (e.g., prior to installation on the press 220 or after removal from the press 220).

The manifold 224 can be disconnected from the one support arm 232*b* and swung downwardly from the supporting position to a stowed position where the manifold 224 depends from the support arm 232*a*. When retracted, the manifold 224 is positioned to provide increased user access to the interior of the press housing 332 via the press opening 334.

It will be understood that the manifold 224 and die assembly 222 can be supported near the press opening 334 by structure other than the support arms. For instance, the illustrated press system 226 also preferably includes a freestanding table 338 that is detached from the press 220 and is configured to support the manifold 224 and the die assembly 220 (see FIG. 32). The table includes a table frame 340 and a bed 342 rotatably mounted on the frame 340. The bed 342 can be rotated about an axis 344 for rotation between an upright position (see FIG. 32) and an inverted position (not shown), in which the bed 342 is rotated one hundred eighty degrees (180°) from the upright position. The die assembly 222 and manifold 224 are removably mounted on the bed 342 by fastening structure (not shown).

Because the bed 342 is rotatably mounted on the frame 340, the die assembly 222 and manifold 224 can be selectively inverted (e.g., prior to installation on the press 220). Furthermore, when using an alternative manifold with lift pins that project from one manifold surface and other lift pins that project from the opposite manifold surface (as described above), the bed 342 can be rotated to conveniently mount the die assembly 222 on either side of the manifold.

In use, the manifold 224 is operable to disengage the die plate assembly 236 from the chase assembly 234. The chase assembly 234 and the die plate assembly 236 are positioned on the manifold 224 and moved to align the lift pins 306 with corresponding bores 276 and openings 302. Pressurized air is supplied to the manifold 224 to extend the lift pins 306 so that the lift pins 306 move the die plate assembly 236 out of engagement with the chase assembly 234.

The manifold 224 is also configured to facilitate alignment and engagement of the chase assembly 234 and the die plate assembly 236. Pressurized air is supplied to the manifold 224 to extend the lift pins 306 and permit placement of the die plate assembly 236 on the lift pins 306. As necessary, the user can slide the die plate assembly 236 laterally relative to the chase assembly 234 to align the die plate assembly 236 and the chase assembly 234. The pressure of pressurized air within the manifold 224 can then be reduced to permit the lift pins 306 to retract, such that the die plate assembly 236 is moved into secure engagement with the chase assembly 234.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A graphic arts assembly operable to be used with a graphic arts plate assembly, said graphic arts assembly comprising:

a lift mechanism including an assembly-supporting mechanism surface and a plurality of lift elements spaced about the assembly-supporting mechanism surface; and a graphic arts support assembly operable to support the graphic arts plate assembly on the lift mechanism prior to the support assembly and plate assembly being used in a press, said graphic arts support assembly including a graphic arts magnetic support structure operable to removably support the graphic arts plate assembly, said magnetic support structure including a support plate and a magnet fixed relative to the support plate, said support plate presenting opposite first and second plate surfaces, with the second plate surface being configured to engage the graphic arts plate assembly, said magnet operable to removably secure the graphic arts plate assembly in engagement with the second plate surface of the support plate, said support plate presenting a plurality of lift openings, each of which extends continuously between the plate surfaces, said graphic arts support assembly removably mounted on the lift mechanism prior to the graphic arts support assembly being used in the press, with the first plate surface engaging the mechanism surface in face-to-face contact, wherein the plurality of lift elements are shiftable into and out of an extended position, with each lift element extending through a respective lift opening and beyond the first and second plate surfaces, when in the extended position, to locate at least part of the graphic arts plate assembly away from the support plate.

2. The graphic arts assembly as claimed in claim 1, said lift mechanism including a powered linear motor, said linear motor including a slidable piston that at least partly defines one of the lift elements.

3. The graphic arts assembly as claimed in claim 1, said lift mechanism including a plurality of slidable pistons that at least partly define corresponding lift elements, said lift elements being spaced along and extending outwardly relative to the second plate surface to cooperatively locate the graphic arts plate assembly away from the support plate.

4. The graphic arts assembly as claimed in claim 3, each of said lift elements being shiftable between the extended position and a retracted position where the lift element is spaced beneath the second plate surface.

5. The graphic arts assembly as claimed in claim 1, said lift openings being spaced along the second plate surface.

6. The graphic arts assembly as claimed in claim 1, said magnetic support structure including a plurality of magnets, said second plate surface extending laterally, said magnets being spaced laterally apart.

7. The graphic arts assembly as claimed in claim 6, said support plate presenting magnet recesses spaced along the second plate surface, with the magnet recesses at least partly receiving corresponding magnets therein.

8. The graphic arts assembly as claimed in claim 7, said magnets presenting respective exposed magnet surfaces that are not covered by the second plate surface.

9. The graphic arts assembly as claimed in claim 8, said second plate surface and said magnet surfaces being substantially coplanar, such that said second plate surface and said magnet surfaces cooperatively engage the graphic arts plate assembly when the graphic arts magnetic support structure supports the graphic arts plate assembly.

10. The graphic arts assembly as claimed in claim 8, each of said magnet recesses receiving a respective one of the magnets, said support plate being threaded at each recess to thereby removably threadably receive the respective one of the magnets.

11. The graphic arts assembly as claimed in claim 1, said magnetic support structure including a plurality of alignment elements configured to engage and thereby position the graphic arts plate assembly relative to the support plate, said alignment elements being spaced along the second plate surface.

12. The graphic arts assembly as claimed in claim 11, each of said alignment elements including an alignment pin extending transversely away from the second plate surface, with the alignment pin configured to be received by the graphic arts plate assembly.

13. The graphic arts assembly as claimed in claim 11, said support plate presenting alignment recesses spaced along the second plate surface, with the alignment recesses partly receiving corresponding alignment elements therein.

14. The graphic arts assembly as claimed in claim 13, said alignment elements presenting respective exposed alignment surfaces extending transversely to the second plate surface, said second plate surface and said alignment surfaces cooperatively engaging the graphic arts plate assembly when the graphic arts magnetic support structure supports the graphic arts plate assembly.

15. The graphic arts assembly as claimed in claim 14, each of said alignment recesses partly receiving a respective one of the alignment elements, said support plate being threaded at each recess to thereby removably threadably receive the respective one of the alignment elements.

16. The graphic arts assembly as claimed in claim 1, each of said lift elements being shiftably coupled relative to the mechanism surface.

17. The graphic arts assembly as claimed in claim 16, each of said lift elements being unitary.

18. The graphic arts assembly as claimed in claim 1, each of said lift elements being shiftable between the extended position and a retracted position where the lift pin is spaced beneath the second plate surface.

19. The graphic arts assembly as claimed in claim 18, each of said lift elements being spaced beneath the first plate surface when in the retracted position.

20. The graphic arts assembly as claimed in claim 19, each of said lift elements being unitary so as to shift past the first plate surface, through the respective lift opening, and past the second plate surface, when shifting from the retracted position to the extended position.

* * * * *